(12) United States Patent
Omar et al.

(10) Patent No.: US 12,018,939 B2
(45) Date of Patent: Jun. 25, 2024

(54) SYSTEM AND METHOD FOR ANALYZING AN OILFIELD CASING USING AN APPARENT THICKNESS APPROACH

(71) Applicant: SCHLUMBERGER TECHNOLOGY CORPORATION, Sugar Land, TX (US)

(72) Inventors: Saad Omar, Sharon, MA (US); Dzevat Omeragic, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 665 days.

(21) Appl. No.: 17/251,833

(22) PCT Filed: Jun. 14, 2019

(86) PCT No.: PCT/US2019/037280
§ 371 (c)(1),
(2) Date: Dec. 14, 2020

(87) PCT Pub. No.: WO2019/241689
PCT Pub. Date: Dec. 19, 2019

(65) Prior Publication Data
US 2021/0254958 A1   Aug. 19, 2021

Related U.S. Application Data

(60) Provisional application No. 62/685,029, filed on Jun. 14, 2018.

(51) Int. Cl.
*G01N 27/72*    (2006.01)
*E21B 47/085*   (2012.01)
(Continued)

(52) U.S. Cl.
CPC .............. *G01B 7/10* (2013.01); *E21B 47/085* (2020.05); *G01V 3/28* (2013.01)

(58) Field of Classification Search
CPC ... G01V 3/28; G01V 3/30; G01V 3/34; G01V 3/38; G01V 3/18; G01V 3/20; G01V 3/22;
(Continued)

(56) References Cited

U.S. PATENT DOCUMENTS 7,640,110 B2   12/2009   Abubakar et al.
7,960,969 B2    6/2011   Mouget et al.
(Continued)

FOREIGN PATENT DOCUMENTS

WO   2018031035 A1   2/2018
WO   2018031038 A1   2/2018
(Continued)

OTHER PUBLICATIONS

Exam Report issued in United Kingdom Patent Application No. GB2019274.6 dated Feb. 11, 2022, 3 pages.
(Continued)

*Primary Examiner* — Thang X Le
(74) *Attorney, Agent, or Firm* — Ashley E. Brown

(57) ABSTRACT

Embodiments included herein are directed towards a system and method for analyzing an oilfield casing using an apparent thickness approach. Embodiments may include providing an induction instrument having at least one of a transmitter and a receiver configured to operate at one or more frequencies. Embodiments may further include generating, using data acquired by the induction instrument, one or more apparent thickness transforms for at least one of a measured attenuation and a phase response associated with an oilfield casing, wherein generating includes assuming a proportionate increase in all casing thicknesses.

20 Claims, 26 Drawing Sheets

(51) Int. Cl.
*G01B 7/06* (2006.01)
*G01V 3/28* (2006.01)

(58) Field of Classification Search
CPC ... G01V 3/24; G01V 3/26; G01V 3/10; G01V 3/265; G01V 3/02; G01V 3/04; G01V 3/06; G01V 3/104; G01B 7/10; G01N 27/223; G01N 33/246; G01R 27/18; G01R 27/20; G01R 31/2621; G01R 31/2623; G01R 31/275; G01R 31/2884
See application file for complete search history.

(56) References Cited

U.S. PATENT DOCUMENTS

| | | | |
|---|---|---|---|
| 8,332,191 | B2 | 12/2012 | Rosthal et al. |
| 8,614,578 | B2 | 12/2013 | Gao et al. |
| 8,958,989 | B2 | 2/2015 | Legendre et al. |
| 9,715,034 | B2 | 7/2017 | Omeragic et al. |
| 9,977,144 | B2 | 5/2018 | David et al. |
| 2013/0193953 | A1* | 8/2013 | Yarbro ............... E21B 47/085 324/76.77 |
| 2015/0127274 | A1 | 5/2015 | Legendre et al. |
| 2015/0204648 | A1 | 7/2015 | Nichols |
| 2015/0338541 | A1 | 11/2015 | Nichols et al. |
| 2016/0245779 | A1 | 8/2016 | Khalaj Amineh et al. |
| 2017/0176630 | A1 | 6/2017 | David et al. |
| 2017/0362925 | A1* | 12/2017 | Zhang ............... E21B 47/007 |
| 2018/0074220 | A1* | 3/2018 | David ............... G01V 3/26 |
| 2018/0106764 | A1* | 4/2018 | Fouda ............... G01V 3/28 |
| 2020/0103374 | A1* | 4/2020 | Guner ............... E21B 47/113 |
| 2020/0141228 | A1* | 5/2020 | Khalaj Amineh .... E21B 47/092 |
| 2020/0182830 | A1* | 6/2020 | Fouda ............... G01N 27/9046 |

FOREIGN PATENT DOCUMENTS

| | | |
|---|---|---|
| WO | 2018080429 A1 | 5/2018 |
| WO | 2019241689 A1 | 12/2019 |

OTHER PUBLICATIONS

Brill, T. M. et al., "Electromagnetic Casing Inspection Tool for Corrosion Evaluation", International Petroleum Technology Conference, IPTC 14865, 2012, 14 pages.
Cuthbert, J. F. et al., "New Casing Inspection Log", Society of Petroleum Engineers of AIME, SPE 5090, 1974, 12 pages.
Constable, S. C. et al., "Occams Inversion a practical algorithm for generation smooth models from electromagnetic sounding data", Geophysics, 1987, 52(3), pp. 289-300.
Dennis, Jr., J. E. et al., "Numerical Methods for Unconstrained Optimization and Nonlinear Equations", SIAM Classics in Applied Mathematics, 1996, 388 pages.
Farquharson, C. G. et al., "A comparison of automatic techniques for estimating the regularization parameter in non-linear inverse problems", Geophysical Journal International, 2004, 156, pp. 411-425.
Nocedal, J. et al., "Numerical Optimization", 2nd edition., Springer Series in Operations Research, 2006, 683 pages.
Omar, et al., "Inversion-based Workflow for Oilfield Nested Multicasing Evaluation Using Electromagnetic Low-frequency Measurements", 43rd Annual Review of Progress in QNDE, 2017, 26, AIP Conference Proceedings 1806, Papger 110020, 11 pages.
Schmidt, T. R., "The Casing Inspection Tool—An Instrument for the In-Situ Detection of External Casing Corrosion in Oil Wells", Corrosion, 1961, 17(7), pp. 329t-333t.
Thiel, M. et al., "Optimization of LWD deep directional resistivity measurement set for realtime well placement based on information content analysis", Schlumberger Journal of Modeling and Simulation, 2015, 6, pp. 139-144.
Wu, w. et al., "Influence of Steel Casing on Electromagnetic Signals", Geophysics, 1994, 59(3), pp. 378-390.
International Search Report and Written Opinion of International Patent Application No. PCT/US2019/037280 dated Oct. 2, 2019, 12 pages.
International Preliminary Report on Patentability of International Patent Application No. PCT/US2019/037280 dated Dec. 24, 2020, 9 pages.
Exam Report issued in United Kingdom Patent Application No. GB2019274.6 dated Jun. 10, 2022, 3 pages.
Knizhnerman, A three-dimensional parametric inversion algorithm for triaxial induction logging data, Geophysics, vol. 71, No. 1, Jan. 2006 (9 pages).

* cited by examiner

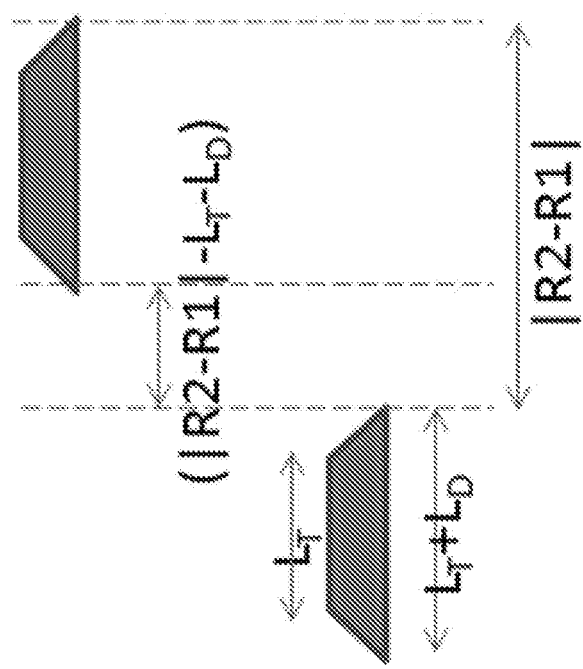
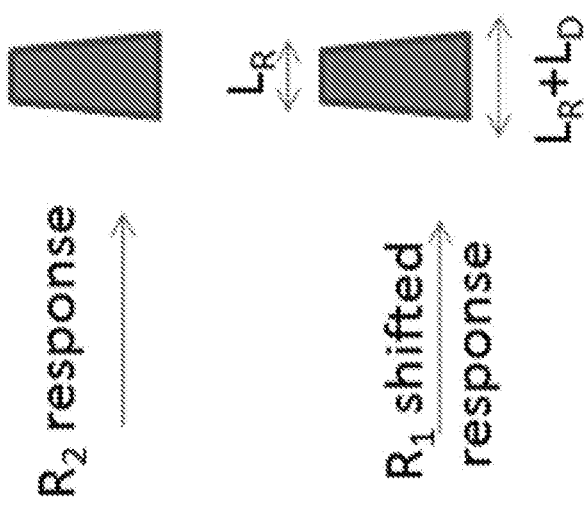
FIG. 20

2600

```
┌─────────────────────────────────────────────────────────────────┐
│  providing an induction instrument having at least one of a transmitter │
│  and a receiver configured to operate at one or more frequencies │
└─────────────────────────────────────────────────────────────────┘
```
2602

```
┌─────────────────────────────────────────────────────────────────┐
│       generating, using at least one processor, one or more apparent │
│  thickness transforms for at least one of a measured attenuation and a phase │
│  response associated with an oilfield casing, wherein generating includes │
│       assuming a proportionate increase in all casing thicknesses │
└─────────────────────────────────────────────────────────────────┘
```
2604

FIG. 26

SYSTEM AND METHOD FOR ANALYZING AN OILFIELD CASING USING AN APPARENT THICKNESS APPROACH

CROSS-REFERENCE TO RELATED APPLICATION

This application claims the benefit of U.S. Provisional Application No. 62/685,029, filed on 14 Jun. 2018; the contents of which are incorporated herein by reference.

FIELD

This application relates to methods and apparatus related to casing measurement inspection platforms.

BACKGROUND

This section is intended to introduce the reader to various aspects of art that may be related to various aspects of the present techniques, which are described and/or claimed below. This discussion is believed to help provide the reader with background information to facilitate a better understanding of the various aspects of the present disclosure. Accordingly, it should be understood that these statements are to be read in this light, and not as an admission.

In well logging via electromagnetic field testing, such as remote field eddy current (RFEC), a field-testing probe is slid within an interior of an electrically conductive tubular or casing. A transmitter of the field-testing probe produces an electromagnetic field that interacts with the casing. The electromagnetic field varies depending on thickness and/or corrosion in the casing, as well as conductivity and magnetic permeability of the casing. Receivers may detect these variations in the electromagnetic field, and interpretation of these variations may be based on far field approximation of the detectable electromagnetic field. Based on these detected variations, the effective thickness and/or corrosion of the casing may be determined. However, RFEC measurements primarily reflect changes to overall thickness of the casings rather than individual casings.

Some casing inspection measurement platforms may be used to handle multiple strings and determine the total thickness of all the pipes. The total metal loss may be evaluated from the look-up table of measured phase, where the receiver voltage is normalized to a signal from a monitor coil wound around the transmitter. The measurements are based on RFEC, where the phase of the receiver induced signal is proportional to total casing thickness if the receiver is sufficiently far from the transmitter.

The RFEC measurements often exhibit an undesired artifact, 'double-indication' or 'ghosting', of casing anomalies (corrosion defect or casing collar). This is due to the non-collocation of the tool receivers and transmitter resulting in double-peaked measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method for analyzing an oilfield casing using an apparent thickness approach is provided. The method may include providing an induction instrument having at least one of a transmitter and a receiver configured to operate at one or more frequencies. The method may further include generating, using data acquired by the induction instrument, one or more apparent thickness transforms for at least one of a measured attenuation and a phase response associated with an oilfield casing, wherein generating includes assuming a proportionate increase in all casing thicknesses.

One or more of the following features may be included. The method may also include removing one or more double-indications of casing anomalies from one or more remote field eddy-current (RFEC) induction measurements and removing casing collar artifacts from one or more shorter transmitter-receiver spacing (non-RFEC) induction measurements. The method may include indicating casing eccentering using the one or more shorter spacing (non-RFEC) induction measurements. Removing casing collar artifacts may include obtaining an unaffected first half of a lobe to restore a second half of a collar response and flattening a ghost segment from the one or more shorter spacing (non-RFEC) induction measurements. Removing one or more double-indications of casing anomalies may include using apparent thicknesses for at least two transmitter-receiver spacings, wherein a difference in two spacings exceeds a length of a transmitter antenna. Removing one or more double-indications of casing anomalies from one or more remote field eddy-current (RFEC) induction measurements may include using apparent thicknesses for at least two spacings, by assigning a higher apparent thickness. The method may include using a nominal thickness and applying an original deviation from the nominal thickness to generate one or more corrected apparent thicknesses. The method may further include using a transform table to generate a raw signal from the one or more corrected apparent thicknesses. The method may further include indicating at least one zone with casing or tool eccentering using shorter spacing measurements, wherein indicating includes monitoring a deviation of an apparent thickness to indicate eccentering. The apparent thicknesses for RFEC measurements may provide an effective total thickness.

In another embodiment, a system for analyzing an oilfield casing using an apparent thickness approach is provided. The system may include an induction instrument having at least one of a transmitter and a receiver configured to operate at one or more frequencies. The system may further include a computing device configured to generate, using data acquired by the induction instrument, one or more apparent thickness transforms for at least one of a measured attenuation and a phase response associated with an oilfield casing, wherein generating includes assuming a proportionate increase in all casing thicknesses.

One or more of the following features may be included. The computing device may be configured to remove one or more double-indications of casing anomalies from one or more remote field eddy-current (RFEC) induction measurements and to remove casing collar artifacts from one or more shorter transmitter-receiver spacing (non-RFEC) induction measurements. The computing device may be configured to indicate casing eccentering using the one or more shorter spacing (non-RFEC) induction measurements. Removing casing collar artifacts may include obtaining an unaffected first half of a lobe to restore a second half of a collar response and flattening a ghost segment from the one or more shorter spacing (non-RFEC) induction measurements. Removing one or more double-indications of casing anomalies may include using apparent thicknesses for at least two spacings, wherein a difference in two spacings exceeds a length of a transmitter antenna. Removing one or more double-indications of casing anomalies from one or more remote field eddy-current (RFEC) induction measurements may include using apparent thicknesses for at least two spacings, by assigning a higher apparent thickness. The computing device may be configured to assume a nominal thickness and applying an original deviation from the nominal thickness to generate one or more corrected apparent thicknesses. The computing device may be configured to use a transform table to generate a raw signal from the one or more corrected apparent thicknesses. The computing device may be configured to indicate at least one zone with casing or tool eccentering using shorter spacing measurements, wherein indicating includes monitoring a deviation of an apparent thickness from a nominal thickness. The apparent thicknesses for RFEC measurements may provide an effective total thickness.

BRIEF DESCRIPTION OF THE DRAWINGS

Various aspects of this disclosure may be better understood upon reading the following detailed description and upon reference to the drawings in which:

FIG. 20 shows a double indication of a casing anomaly from an induction tool in depth in accordance with an embodiment of the present disclosure;

FIG. 26 shows a flow diagram in accordance with an embodiment of the present disclosure.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to devices and methods for measuring metal thickness in individual casings among a plurality of nested casings and disposed in a well using a measurement probe with a transmitter and a plurality of receivers. In particular, inversion techniques may be used to determine one or more characteristics of individual casings, such as thickness, center of casing cross-section, eccentering, magnetic permeability (e.g., relative magnetic permeability), and/or electrical conductivity.

Figure 1:
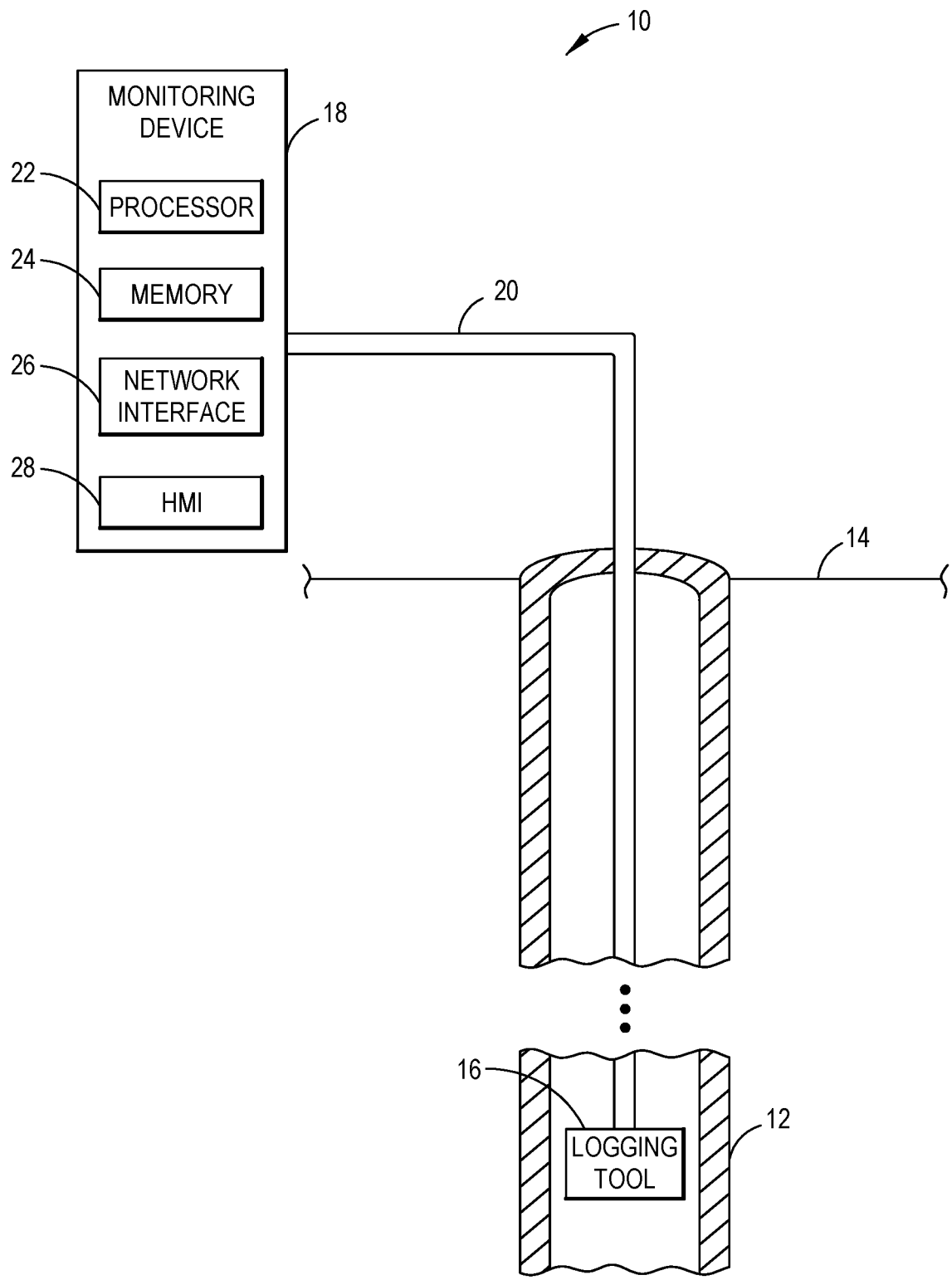
FIG. 1 is a block diagram of an electromagnetic measurement system, in accordance with an embodiment of the present disclosure.

With the foregoing in mind, FIG. 1 is a block diagram of an electromagnetic measurement system 10 that may be used to determine thickness (e.g., 0.1 inches to 4 inches) and/or defects due to corrosion of one or more casings 12, in accordance with an embodiment of the present disclosure. For example, an outer surface of the one or more casings 12 may be corroded by contact with earth and/or fluids. In some embodiments, the casings 12 may be measured while within the earth 14, water, and/or air. The electromagnetic measurement system 10 includes an electromagnetic logging tool 16 that may be lowered into the one or more casings 12. The logging tool 16 generates a time-varying magnetic field signal that interacts with the casings 12 having conductive and magnetic properties. The logging tool 16 may be energized from the surface or have its own internal power used to emit the time-varying magnetic field signal. The magnetic field signal closes outwards from the logging tool 16 through and along the casings 12. The magnetic field signal from the logging tool 16 may therefore generate eddy currents in the casings 12 and induce corresponding secondary magnetic field signals. As will be discussed below, the logging tool 16 may detect the secondary magnetic field signals. In areas of metal loss in the casings 12, the secondary magnetic field signal may arrive at the logging tool 16 with less phase change and/or greater signal strength (e.g., higher amplitude) than otherwise, owing to the reduced path through the one or more casings 12. Similarly, in areas of metal gain (with respect to nominal thickness, e.g., due to casing collars) in the casings 12, the secondary magnetic field signal may arrive at the logging tool 16 with greater phase change and/or lesser signal strength (e.g., lower amplitude) than otherwise, owing to the increased path through the one or more casings 12.

The logging tool 16 may be coupled to a monitoring device 18 via a communication link 20 that maintains connection between the logging tool 16 and the monitoring device 18 as the logging tool 16 traverses the length of the one or more casings 12. The monitoring device 18 may include a data processing system that includes a processor 22, a memory 24, a network interface 26, a human machine interface (HMI) 28, and/or other electronic components suitable for monitoring and/or analyzing measurements of the logging tool 16 and relaying that information to an appropriate destination such an end user and/or log.

In the monitoring device 18, the processor(s) 22 and/or other data processing circuitry may be operably coupled with the memory 24 to execute instructions. Such programs or instructions executed by the processor(s) 22 may be stored in any suitable article of manufacture that includes one or more tangible, non-transitory, machine-readable media at least collectively storing the instructions or routines, such as the memory 24. The memory 24 may include any suitable articles of manufacture for storing data and executable machine-readable instructions, such as RAM, ROM, rewritable flash memory, hard drives, and optical discs. Also, programs (e.g., an operating system) encoded on such a computer program product may also include instructions that may be executed by the processor(s) 22. In some embodiments, the logging tool 16 may include one or more processors that perform at least a portion of the below-described processing. Further references to "the processor 22" include the processor 22 of the monitoring device 18, as well as any processor included in the logging tool 16.

The network interface 26 may include circuitry for communicating over one or more networks. For example, the network interface 26 may include interfaces for a personal area network (PAN), such as a Bluetooth network, for a local area network (LAN), such as an 802.11x Wi-Fi network, and/or for a wide area network (WAN), such as a 3G, 4G, or LTE cellular network.

The HMI 28 may include one or more input and/or output devices for enabling communication between the processor 22, the memory 24, the network interface 26, and one or more users. In some embodiments, the HMI 28 may include one or more input devices and one or more output devices. For example, in certain embodiments, the HMI 28 may include a display and/or a keyboard, a mouse, a touch pad, or other input devices suitable for receiving inputs from a user. In some embodiments, the HMI 28 may include a touch-screen liquid crystal display (LCD), for example, which may enable users to interact with a user interface of the monitoring device 18.

Figure 2:
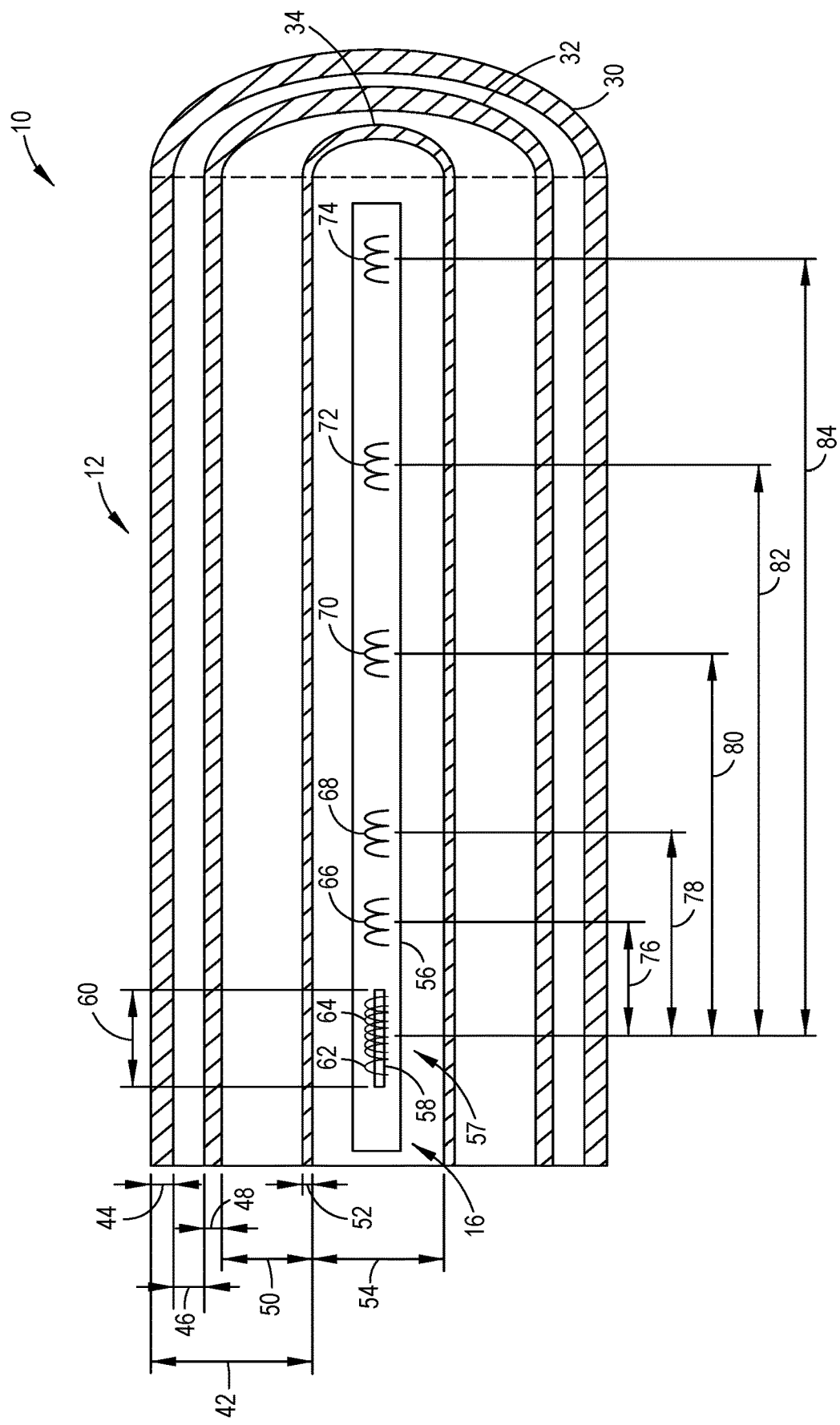
FIG. 2 is a cross-sectional view of an electromagnetic measurement system, in accordance with an embodiment of the present disclosure.

FIG. 2 is a cross-sectional view of the electromagnetic measurement system 10 located inside the one or more casings 12, in accordance with an embodiment of the present disclosure. The illustrated embodiment of the casing 12 includes an outer casing thickness 44, an outer separation 46, a middle casing thickness 48, a middle separation 50, and an inner casing thickness 52. In some embodiments, the term "spacing" may refer to a coil separation or gap and may correspond to a diameter difference (e.g., ID3-OR2, etc.). Although the shown embodiment illustrates three casings with a total thickness 42 including an outer casing 30, a middle casing 32, and an inner casing 34, other embodiments may include 1, 2, 4, 5, or more casings. The total thickness 42 of the casings includes the sum of the casing thicknesses 44, 48, 52. In some embodiments, the casings may include a production tubing, an intermediate casing, a surface casing, and a conductor casing. In some embodiments, one or more of the spacings may include structural but substantially nonconductive material, such as cement. The logging tool 16 traverses the casings 12 within the casings 12 of an inner diameter 54 located at the center of the casings 12. In certain embodiments, the logging tool 16 includes a housing 56 that encloses the logging tool 16 components. In some embodiments, the housing 56 may be a pressure-resistant housing. Within the housing 56, the logging tool 16 includes one or more transmitters 57 that includes a transmitter magnetic core 58 having a length 60. In some embodiments, the transmitter magnetic core 58 may be made of silicon steel. In some embodiments, two windings may be wound around the transmitter magnetic core 58: a transmission winding 62 and a monitor winding 64. In some embodiments, a single transmission winding 62 may be wound around magnetic core 58.

The logging tool 16 also may include a plurality of receivers (e.g., 66, 68, 70, 72, 74). The present disclosure contemplates any number of receivers greater than one. In the illustrated embodiment, the receivers 66, 68, 70, 72, 74 are each located axially along the logging tool 16. Each receiver 66, 68, 70, 72, 74 is located some distance away from the transmitter 57. For example, the receiver 66 may be located a distance 76 from the transmitter 57, the receiver 68 may be located a distance 78 from the transmitter 57, the receiver 70 may be located a distance 80, the receiver 72 may located a distance 82 from the transmitter 57, and the receiver 74 may be located a distance 84 from the transmitter 57. In certain embodiments, each distance 78, 80, 82, and 84 may be a multiple of the distance 76. For example, the distance 78 may be twice the distance 76, and distances 80, 82, and 84 may respectively be three, four, and five times the distance 78. Furthermore, in some embodiments, the distance 76 may be less than, greater than, or equal to the length 60 indicating the length of transmitter. The receivers 66, 68, 70, 72, 74 may detect the strength and/or phase of the secondary magnetic field from the casing 12. These detected values may then be used to determine a thickness of the casing(s) 12 using any suitable electromagnetic measurement analyses. Although the receivers 66, 68, 70, 72, 74 are illustrated as axially located receivers, in some embodiments, at least some of the receivers 66, 68, 70, 72, 74 may be located azimuthally adjacent to an inner wall of the casing. In certain embodiments, at least some of the receivers 66, 68, 70, 72, 74 may have an azimuthal sensitivity (e.g., saddle or tilted coils, Hall-effect sensor, or giant magnetoresistive sensor) that may detect azimuthal location of defects or transverse cracks in the casing 12. There may be embodiments having multiple transmitter configurations where the windings are transverse or obliques as in a saddle or tilted coil arrangement which couple to these receiver or additional receiver windings. In some embodiments, one or more of the receivers 66, 68, 70, 72, 74 may include a core. In some embodiments, one or more of the receivers 66, 68, 70, 72, 74 may not include a core.

The logging tool 16 may operate at any suitable number of frequencies. For example, the logging tool 16 may operate at frequencies from 0.1 to 50 Hertz (Hz). The logging tool 16 may also acquire data from odd harmonics, e.g., from a square wave-based transmitter source signal. The same approach may be applied to transient electromagnetic measurements by applying a Fast Fourier transform algorithm to waveforms and handling the result as multi-frequency data.

Figure 3:
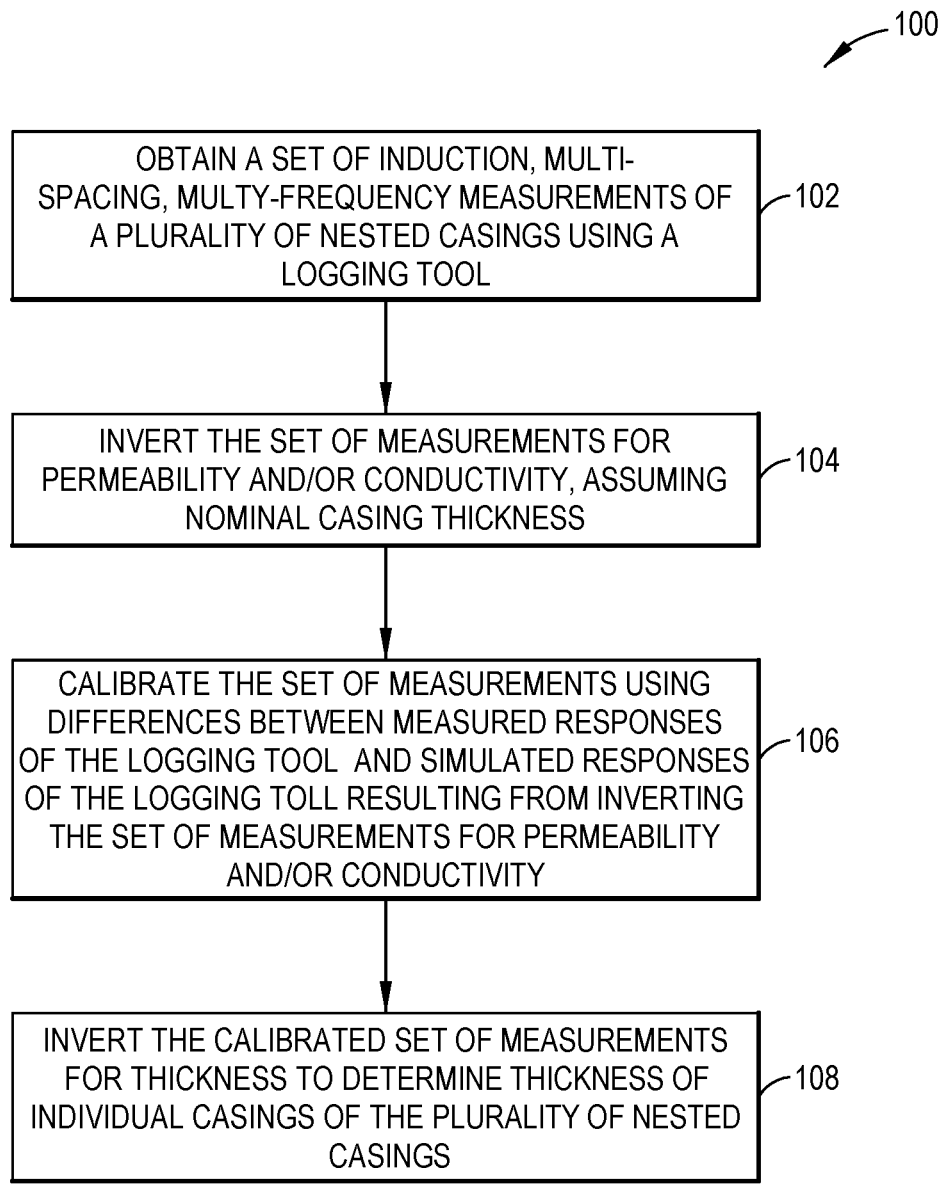
FIG. 3 a flowchart of a method for determining thicknesses of individual casings among a plurality of nested casings, in accordance with an embodiment of the present disclosure.

Turning now to FIG. 3, a flowchart of a method 100 for determining thicknesses of individual casings (e.g., 30, 32, 34) among a plurality of nested casings (e.g., 12) using a set of induction multi-spacing and multi-frequency measurements, in accordance with an embodiment of the present disclosure, is illustrated. The processor 22 controls the logging tool 16 to obtain (block 102) a first set of induction, multi-spacing, multi-frequency measurements of the plurality of nested casings 12. That is, the processor 22 controls the transmitter 57 of the logging tool 16 to emit a time-varying magnetic field signal towards the plurality of nested casings 12. The time-varying magnetic field signal induces eddy currents in the plurality of nested casings 12, detected by the plurality of receivers (e.g., 66, 68, 70, 72, and/or 74) of the logging tool 16.

The processor 22 inverts (block 104) the set of measurements for one or more characteristics of the plurality of nested casings 12. In particular, the processor 22 inverts the set of measurements for magnetic permeability and/or electrical conductivity of the plurality of nested casings 12, assuming a nominal thickness of the plurality of nested casings 12. The processor 22 may assume that the permeability and/or conductivity of each casing 12 is the same for all casings 12. The results of the method 100 may be more accurate if the set of measurements is inverted for more than one characteristic, e.g., both permeability and conductivity. Inversion minimizes a cost function in terms of difference between a modeled tool response (e.g., a response of the logging tool 16) and actual measurements by the logging tool 16, sometimes referred as the error term, through adjusting a multi-string casing model, defined by geometry and properties. The cost function may be augmented with an additional regularization term. The balance between the error and regularization is typically determined heuristically (see Dennis, Jr., J. E., and Robert B. Schnabel, *Numerical Methods for Unconstrained Optimization and Nonlinear Equations*, SIAM Classics in Applied Mathematics, 1996; see also Nocedal, Jorge and Stephen J. Wright, *Numerical Optimization*, 2nd ed., Springer Series in Operations Research, 2006) or is managed by the adaptive regularization methods (see Constable, Steven C., and Robert L. Parker and Catherine G. Constable, *Occam's inversion: A practical algorithm for generation smooth models from electromagnetic sounding data*, Geophysics, vol. 52, no. 3, pp. 289-300, 1987; see also Farquharson, Colin G., and Douglas W. Oldenburg, *A comparison of automatic techniques for estimating the regularization parameter in nonlinear inverse problems*, Geophys. J. Int., 2004 156, pp. 411-425).

Inversion minimizes the cost function in terms of the difference between the modeled tool response s(x) with unknown model parameters x and the actual measurements m. The unknown model may include centered or eccentered casings 12. A software program that may perform electromagnetic simulation of sensor responses with variable properties, such as thickness, center of casing cross-section, eccentering, permeability, and conductivity of the casings 12, may be used in an inversion process to compare the simulated responses to measured sensor responses. For the error function e(x) defined as:

$$e(x) = |s(x) - m|, \quad (1)$$

the cost function may be defined in a least squares sense as:

$$C(x) = \frac{1}{2}[\|W \cdot e(x)\|^2 + \lambda \|W_x \cdot (x - x_{ref})\|^2] \quad (2)$$

where W is a data weighting matrix that may be defined in terms of expected standard deviation ($\sigma_i$) of corresponding measurement channels $W_d = \text{diag}(1/\sigma_i)$, $W_x$ is parameter weighting matrix of the regularization term, and $\lambda$ is regularization constant.

The model parameters x may be obtained by minimization of the cost function:

$$x^* = \min_x [C(x)]. \quad (3)$$

The model parameters x may be bounded by box constraints, such that ($x_{min} \leq x \leq x_{max}$).

For a given parameter set x, the cost function is linearized, such that:

$$e(x+p) \approx e(x) + J(x) \cdot p \quad (4)$$

where J(x) is a Jacobian matrix and contains first derivatives of a simulated responses with respect to model parameters x:

$$(J(x))_{ij} = \frac{\partial e_i}{\partial x_j}(x) = \frac{\partial s_i}{\partial x_j}(x) \quad (5)$$

and the step p that decreases the cost function is determined iteratively until convergence.

A linearized error term is inserted in the cost function, such that the linearized cost function is:

$$C(x+p) \approx L(p) = C(x) + g(x) \cdot p + \frac{1}{2} p^T \cdot H(x) \cdot p \quad (6)$$

with a gradient:

$$g(x) = J^T \cdot W^T W \cdot e(x) + \lambda W_x^T \cdot W_x \cdot (x - x_{ref}) \quad (7)$$

and a Hessian matrix:

$$H(x) = J^T \cdot W^T \cdot W \cdot J + \lambda W_x^T \cdot W_x. \quad (8)$$

The regularization term is added to the cost function to bias the solution towards $x_{ref}$. It is chosen as the previous iteration step value in order to penalize large changes in parameter values. The regularization constant $\lambda$ is proportional to a squared error term:

$$\lambda = \lambda_{input} \|W \cdot e(x)\|^2, \quad (9)$$

and decreases a bias of the inversion with progression towards a global minimum (see U.S. Pat. No. 7,640,110, Abubakar, A., T. M. Habashy, V. Druskin, S. Davydycheva, and L. Knizhnerman, *A three-dimensional parametric inversion algorithm for triaxial induction logging data*, Geophysics, Vol. 71, No. 1, January 2006).

The Huber inversion may be used, as it is robust to data outliers and noise. As such, the error term of the cost function is defined as:

$$x^2 = \Sigma_i \varphi(w_i \cdot e_i(x)) \qquad (10)$$

with the Huber function:

$$\varphi(y) = \begin{cases} y^2 & |y| > \Delta \\ 2\delta(|y| - 0.5\Delta) & |y| > \Delta \end{cases} \qquad (11)$$

where y corresponds to the error (the difference between the model response and the actual measurements) and $\Delta$ is a threshold where the error calculation changes from squared to linear.

The inversion can resolve any subset of following parameters:

1. thickness $th_i$ of each casing 12;
2. cross-section center $c_i$ of each casing 12;
3. relative magnetic permeability $\mu_i$ of the plurality of casings 12; and
4. electric conductivity $\sigma_i$ of the plurality of casings 12.

The inversion model may assume that metal loss on the inside and the outside of the casings 12 is identical. The inversion model may also assume that the casings 12 are centered. The inversion model parameterization also enables inverting for the inner and/or outer diameter of individual casings (e.g., 30, 32, 34), which may be useful when there is sufficient information to resolve these parameters (e.g., from the measurement data and/or from some other data, such as ultrasonic measurements).

The results of the inversion may be processed to increase resolution and accuracy. A data resolution matrix is defined in terms of sensitivities (Jacobian matrix, J) and may include the data weight and the regularization terms used in the inversion (see Thiel, Michael, Dzevat Omeragic, and Tarek Habashy, *Optimization of LWD deep directional resistivity measurement set for real-time well placement based on information content analysis*, Schlumberger Journal of Modeling and Simulation, vol. 6, pp. 139-144, August 2015):

$$\hat{m} = R^{data} \cdot m^{obs} = J[J^T W^T W J + \lambda W_x^T W_x]^{-1} J^T W^T W \cdot m^{obs}. \qquad (12)$$

A symmetrized version of $R^{data}$ may be used to analyze off-diagonal elements of $R^{data}$ and a dependence of one reconstructed data point on the other data points, $$R_{sym}^{data} = W J [J^T W^T W J + \lambda W_x^T W_x]^{-1} J^T W^T. \qquad (13)$$

The uncertainty in the inverted parameters may be derived from the Hessian matrix H, as illustrated in Equation 8 above. Additionally, the error term $\chi^2$ may be expressed as illustrated in Equation 10 above. As such, the mathematical uncertainty $\sigma_j$ in the $j^{th}$ inverted parameter is given by:

$$\sigma_j = \sqrt{x^2} [H^{-1}]_{j,j}. \qquad (14)$$

Similarly, correlation of the inverted parameters i and j may be obtained from normalized off-diagonal elements of the inverted Hessian matrix:

$$[C_x]_{i,j} = [H^{-1}]_{i,j} / \sqrt{[H^{-1}]_{i,i}[H^{-1}]_{j,j}} \qquad (15)$$

Using the inversion model, the processor 22 may invert (block 102) the set of induction, multi-spacing, multi-frequency measurements acquired inside of the plurality of nested casings 12 for casing magnetic permeability and electric conductivity, assuming a nominal thickness of all casings. The nominal thickness may be an original thickness of the casing 12 before being installed in the well. In some embodiments, the nominal thickness may be the original thickness of the casing 12, minus an estimation or a measurement of degradation based on the time the casing 12 has been in the well. In some embodiments, the nominal thickness may be constrained for thickness of first casing string or internal radii based on external information obtained from some other tool, such as ultrasonic measurement or other high frequency electromagnetic sensor. The inversion may be more effective when performed on a data section of the set of measurements (i.e., a calibration interval) that exhibits minimal perturbation (as a result of minimal corrosion to the casing 12).

The processor 22 calibrates (block 106) the set of measurements using differences between measured responses of the logging tool 16, and simulated responses of the logging tool 16 resulting from inverting (block 102) the set of measurements for casing magnetic permeability and/or electric conductivity. That is, the magnetic permeability and electrical conductivity of each casing 12, determined in block 104, is used to calibrate the set of measurements from block 102. The set of measurements may be calibrated, such that differences between the measured and simulated tool responses for the inversion model, corresponding to casing permeability and/or conductivity, are zeroed over the calibration interval.

The processor 22 inverts (block 108) the calibrated set of measurements to determine thickness of the individual casings (e.g., 30, 32, 34) of the plurality of nested casings 12. In particular, the inversion techniques as discussed above may be used to invert the calibration offsets of the set of measurements, along with the thickness of the individual casings (e.g., 30, 32, 34).

Figure 4:
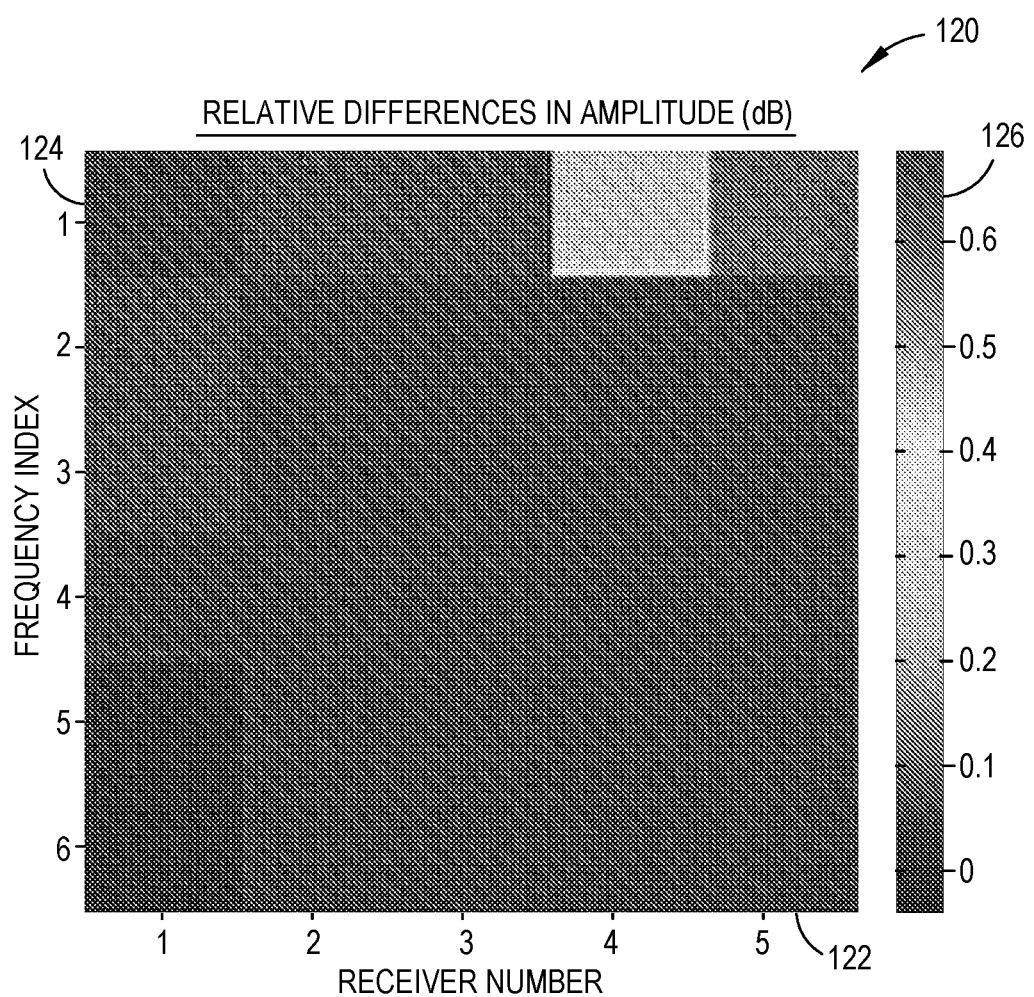
FIG. 4 is a plot of the relative difference in amplitude between synthetic data and data reconstructed with the inversion techniques, in accordance with an embodiment of the present disclosure.
Figure 5:
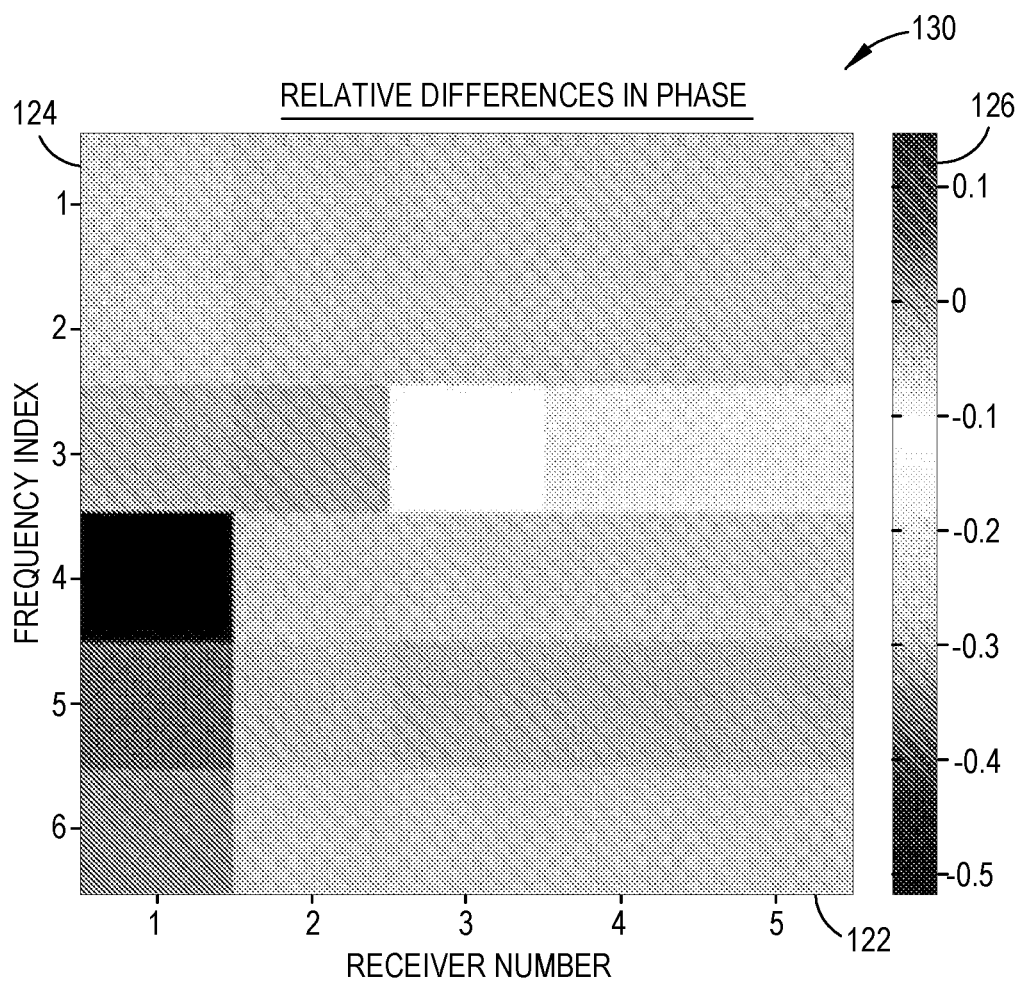
FIG. 5 is a plot of the relative difference in phase between synthetic data and data reconstructed with the inversion techniques, in accordance with an embodiment of the present disclosure.

Turning now to FIGS. 4 and 5, plots 120, 130 depict relative differences between noisy synthetic (i.e., simulated) and accurate modeled data for two casings test configurations. In particular, the source of random noise in the synthetic data was due to finite-accuracy numerical discretization. Thirty-six sets of synthetic data for two nested casings were generated to test the inversion techniques described above. The modeled casings have a relative magnetic permeability ($\mu r$) of 80 and conductivity ($\sigma$) of $5\times10^6$ Siemens per meter (S/m). The inner casing has an outer diameter of 4.5 inches (in) and corrosion on the inner surface, which may reduce the nominal thickness of the inner synthetic casing from 0.6 in to 0.0 in. The outer casing has outer diameter of 7 in and corrosion on the inner surface, which may reduce the nominal thickness of the outer casing from 0.8 in to 0.0 in. The sets of synthetic data include measured signal for five receivers of the logging tool 16.

FIG. 4 is a plot 120 of the relative difference in amplitude (in dB) between noisy synthetic data and data simulated for nominal casing thicknesses using modeling code used in the inversion, in accordance with an embodiment of the present disclosure.

FIG. 5 is a plot 130 of the relative difference in phase between noisy synthetic data and data simulated for nominal casing thicknesses using the modeling code used in the inversion, in accordance with an embodiment of the present disclosure. Both plots 120, 130 include a horizontal axis 122 representing the five receivers (1-5) of the logging tool 16, and a vertical axis 124 representing the frequencies (indexed as 1-6) operated by the logging tool 16. The vertical bar 126 indicates the relative difference between the synthetic data and data modeled with the inversion techniques, where a value of 0 represents no relative difference and each incremental value of 0.1 corresponds to a 10% difference with respect to a modeled response. The noisy synthetic data was also inverted for the outer diameter of individual casings.

Figure 6:
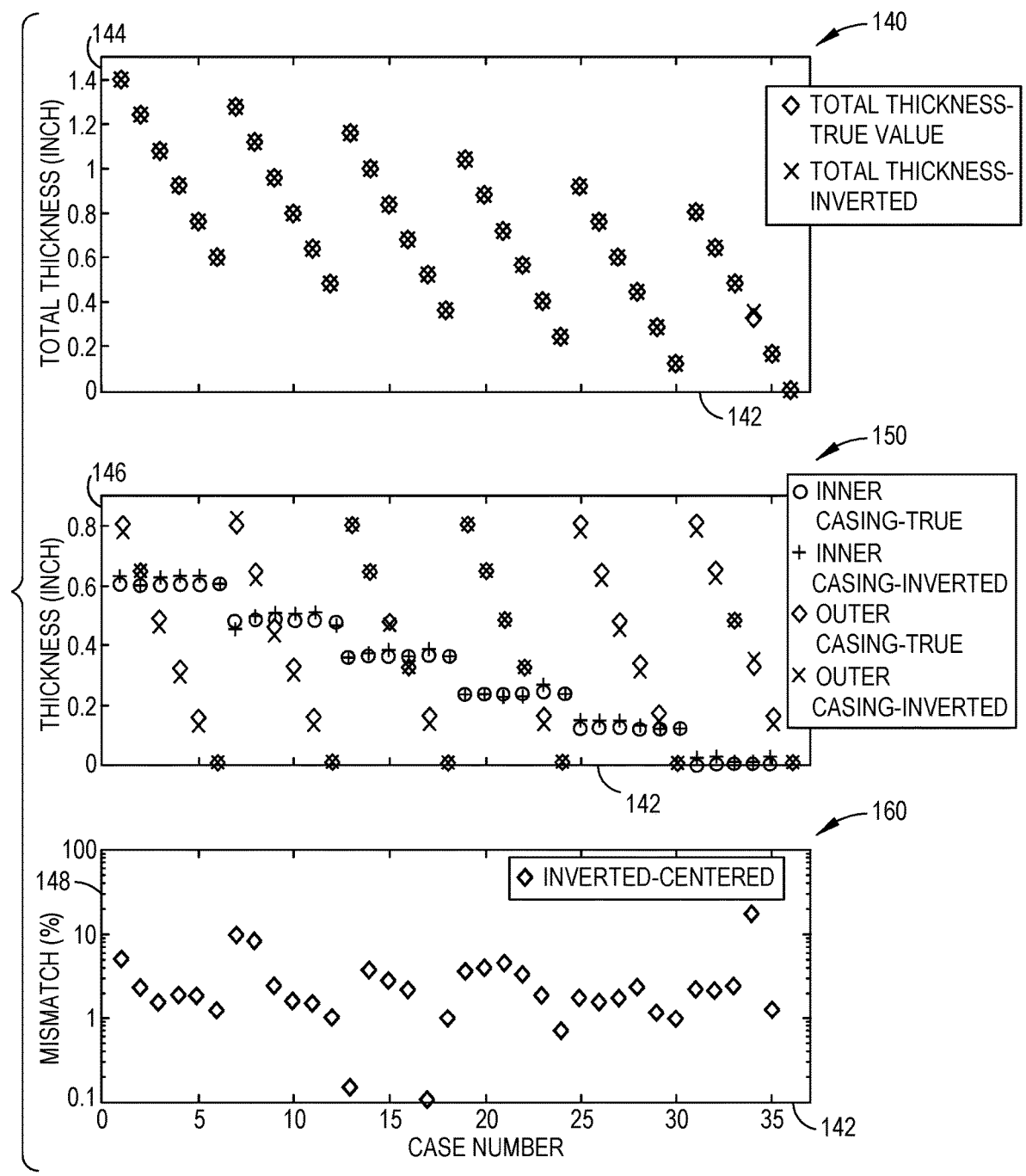
FIG. 6 is a set of three plots of inversion results, in accordance with an embodiment of the present disclosure.

FIG. 6 is a set of three plots 140, 150, 160 of the inversion results, in accordance with an embodiment of the present disclosure. Each plot 140, 150, 160 includes a horizontal axis 142 representing the thirty-six sets of synthetic data (by case number) generated for the two nested synthetic casings. The plot 140 includes a vertical axis 144 representing total thickness in inches of the two nested synthetic casings. The plot 140 compares the total thickness data (true value provided by the synthetic data) vs. the inversion-reconstructed total thickness values. The plot 150 includes a vertical axis 146 representing thickness in inches of each of the two nested casings. The plot 150 compares the true thickness data of the inner and outer casings vs. the inversion-reconstructed thickness of the inner and outer casings. The plot 160 includes a vertical axis 148 that represents and illustrates mismatch in percentage of differences between the noisy synthetic data vs. the simulated responses corresponding to the inversion-reconstructed models. As illustrated, the disclosed inversion technique performs well and accurately identifies thickness of individual casings.

Figure 7:
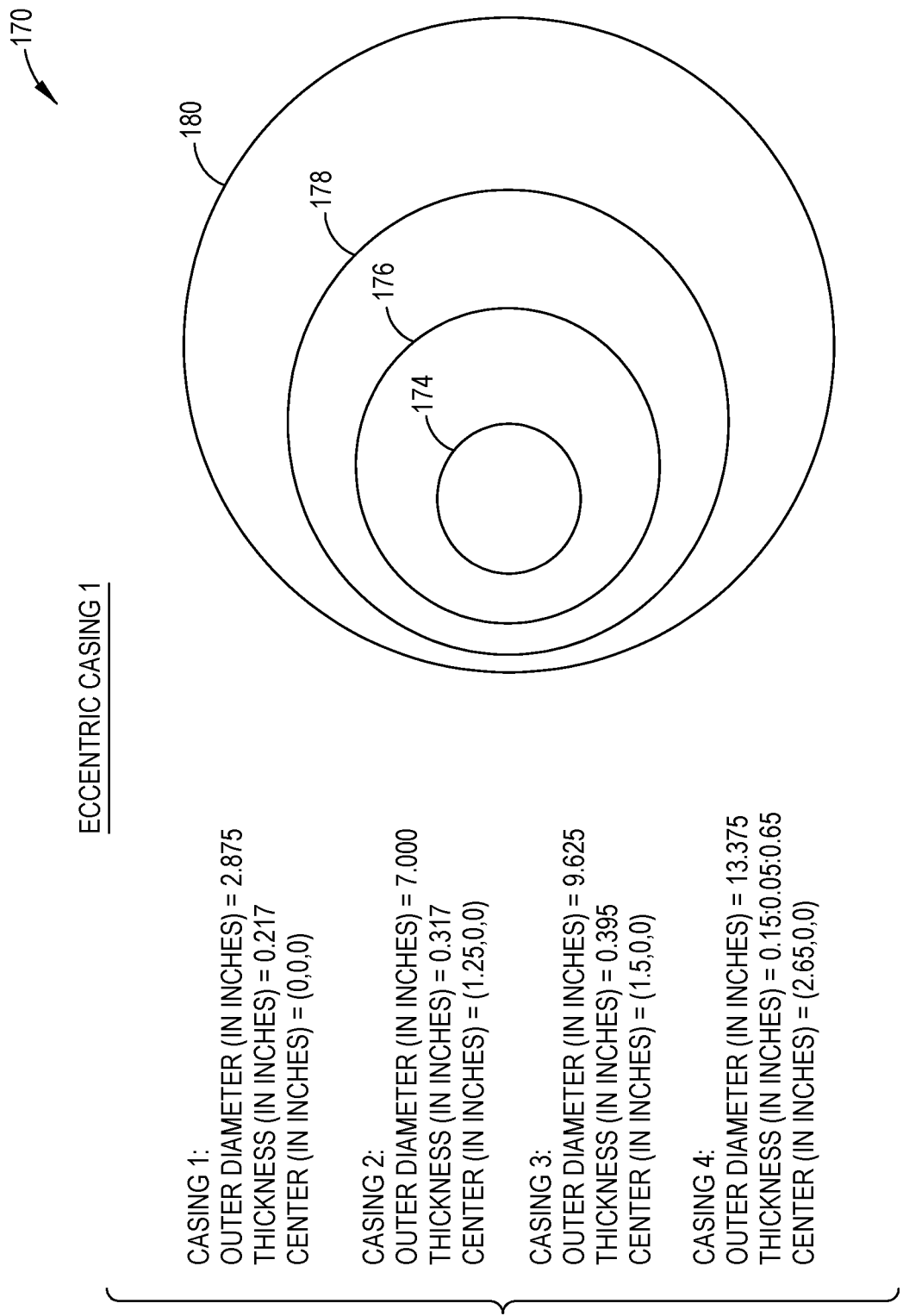
FIG. 7 is a diagram of eccentered casings.
Figure 8:
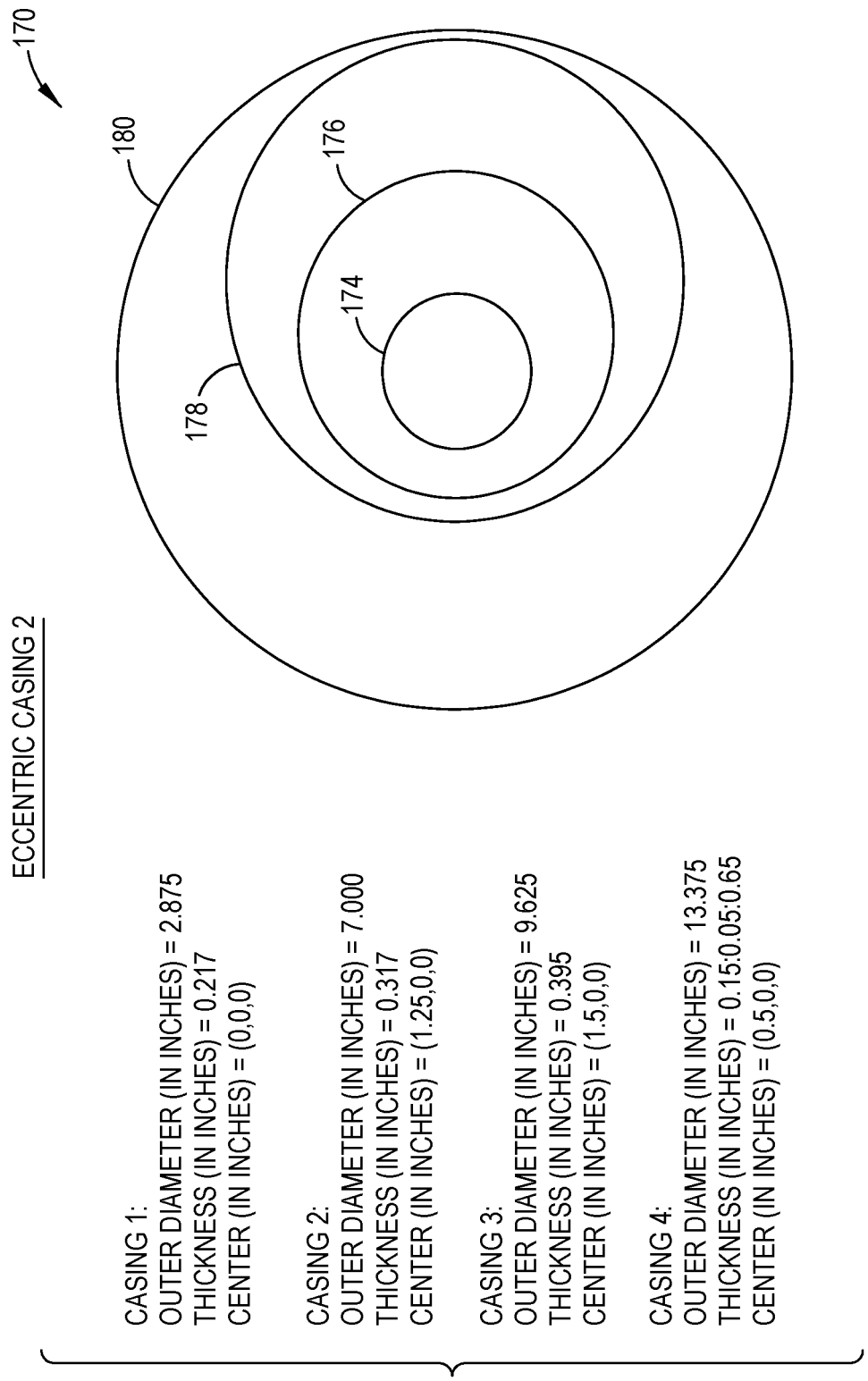
FIG. 8 is a diagram of eccentered casings.
Figure 9:
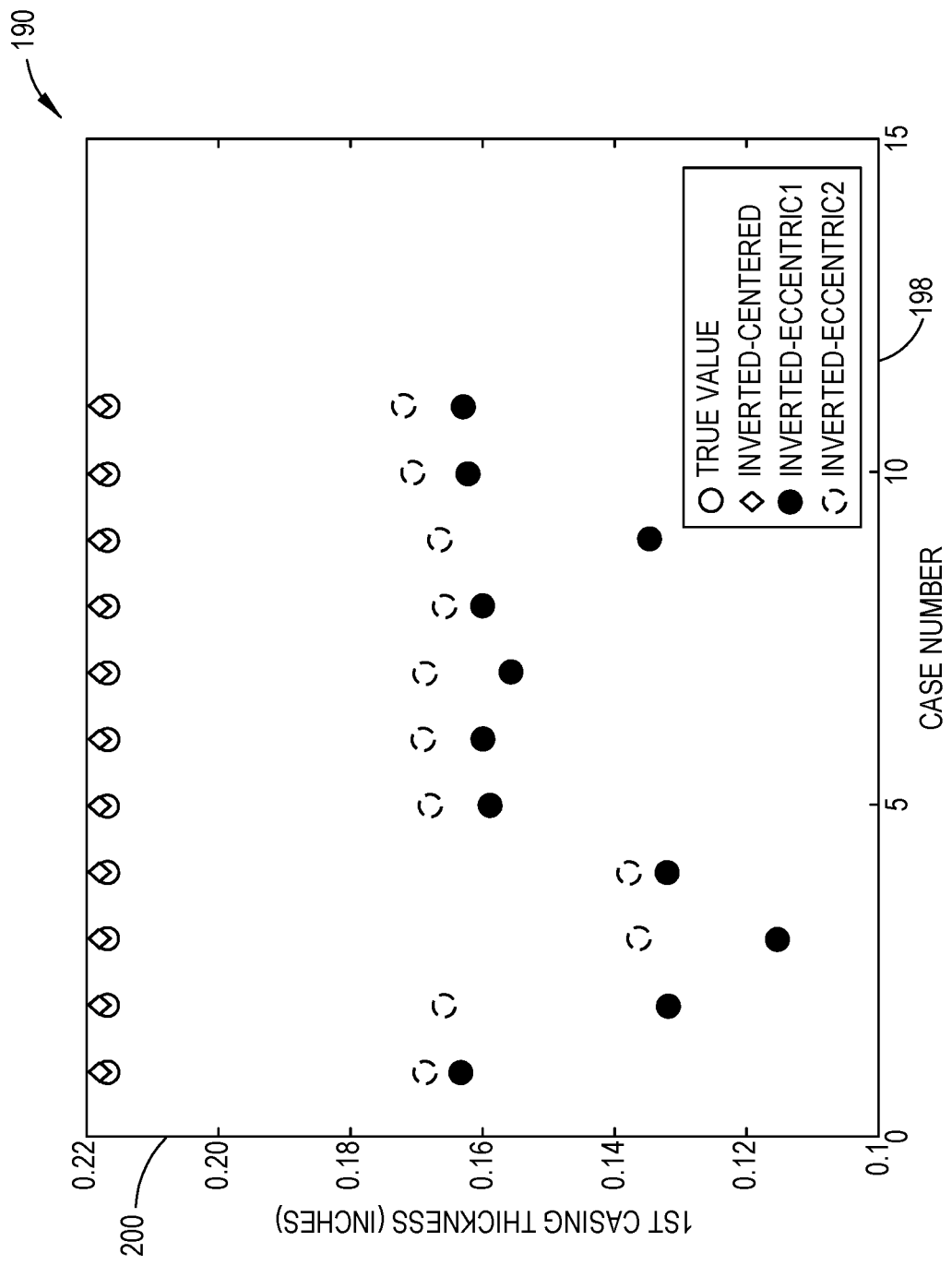
FIG. 9 is a plot of true and inverted individual casing thickness for synthetic data, in accordance with an embodiment of the present disclosure.
Figure 10:
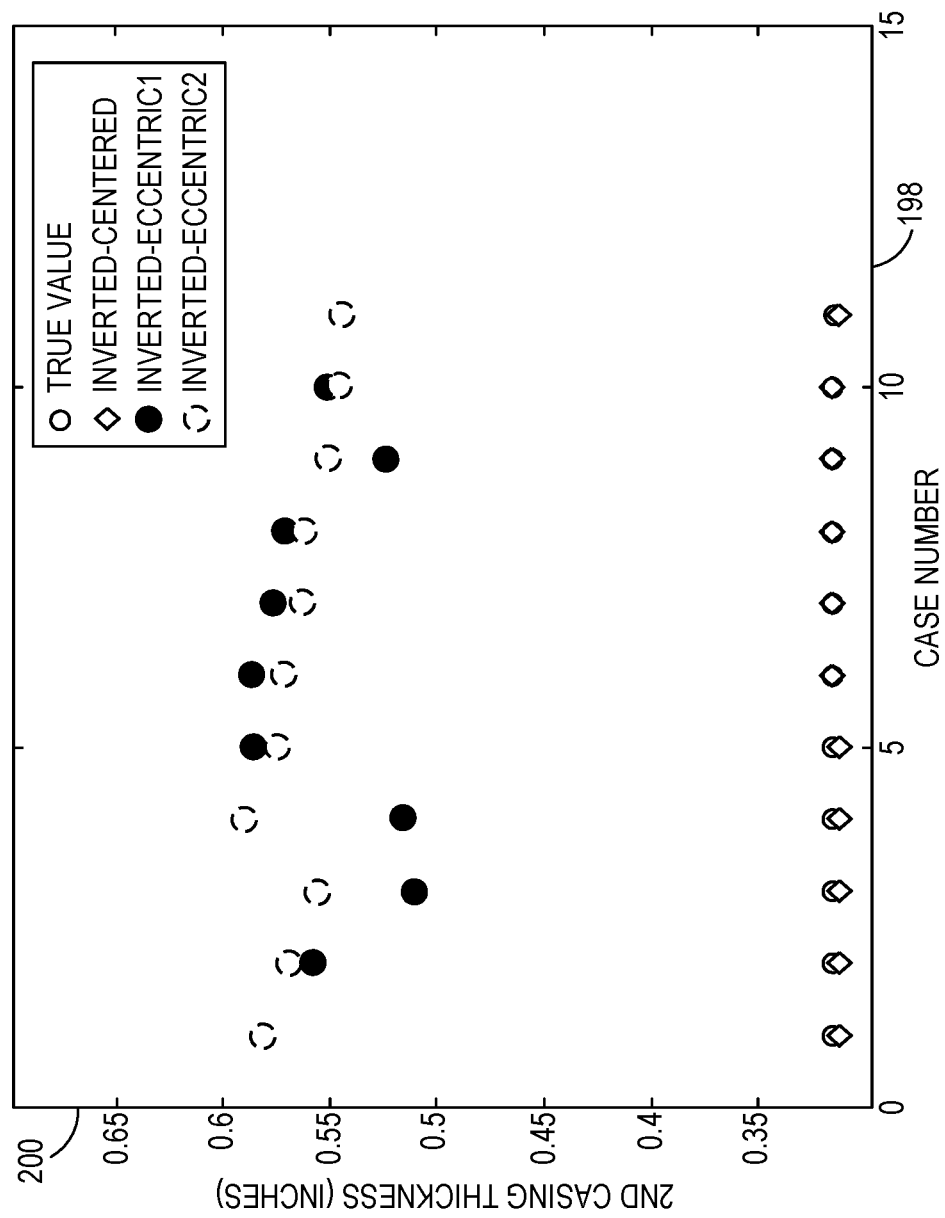
FIG. 10 is a plot of true and inverted individual casing thickness for synthetic data, in accordance with an embodiment of the present disclosure.
Figure 11:
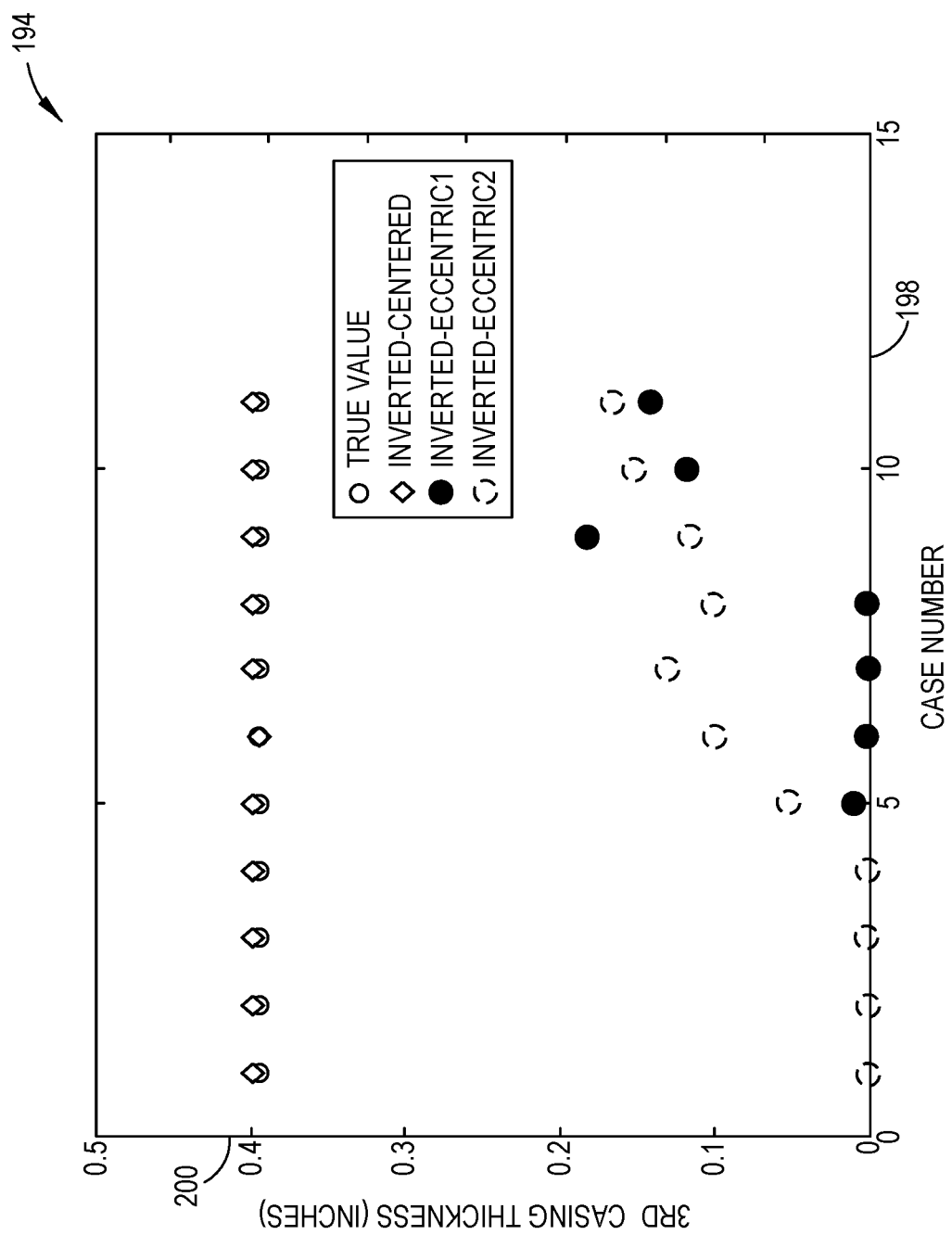
FIG. 11 is a plot of true and inverted individual casing thickness for synthetic data, in accordance with an embodiment of the present disclosure.
Figure 12:
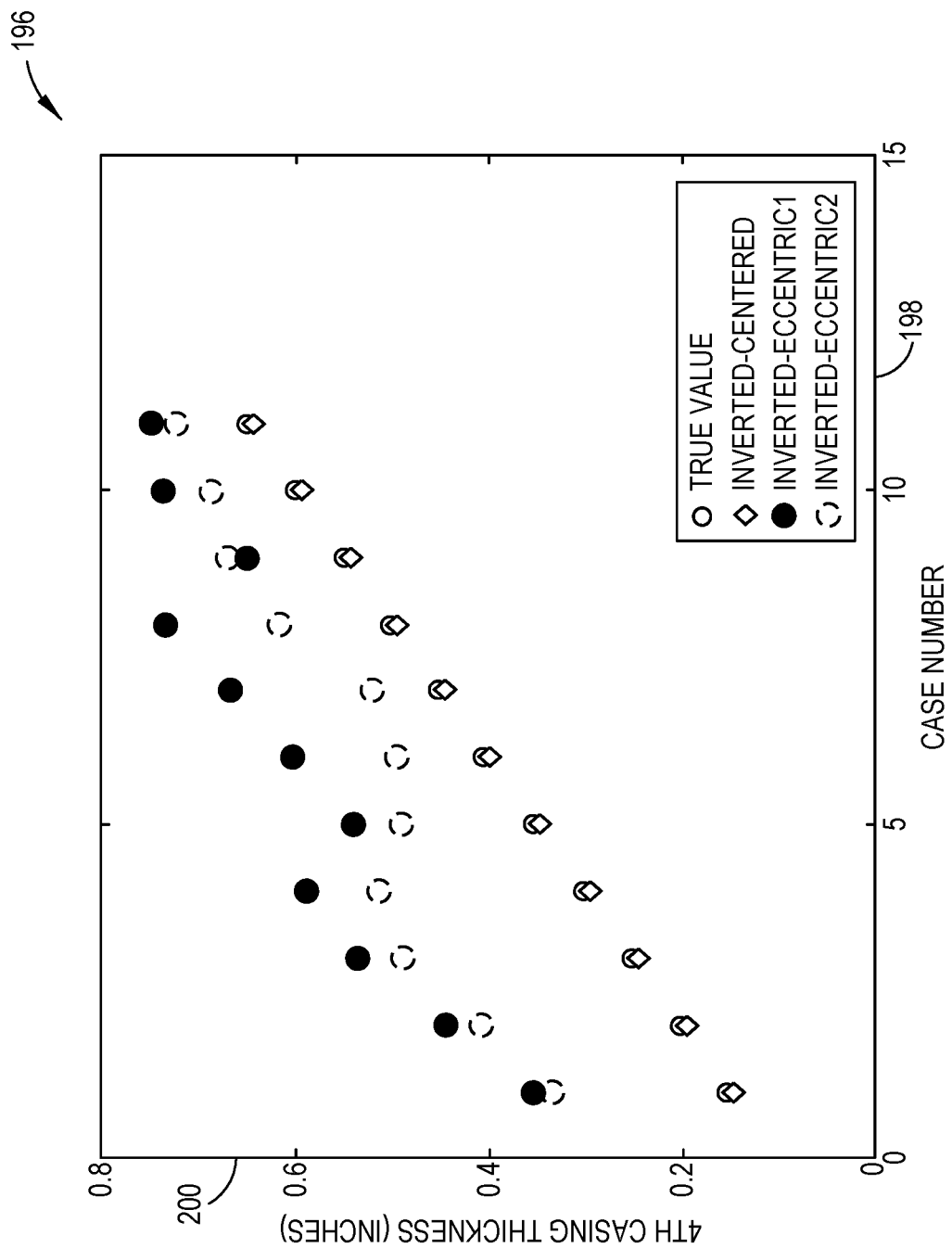
FIG. 12 is a plot of true and inverted individual casing thickness for synthetic data, in accordance with an embodiment of the present disclosure.

The inversion techniques above may be used to identify eccentering of individual casings in the plurality of nested casings 12. In particular, a threshold comparison may be made using the mismatch percentages for data corresponding to all receivers of the logging tool 16 and for data corresponding to receivers of the logging tool 16 with only long spacings. A long spacing may be a distance of a receiver from a center of a transmitter 57 that is greater than three times the outer diameter of the outermost casing of the plurality of nested casings. It follows that a short spacing may be a distance of the receiver from the center of the transmitter 57 that is less than or equal to three times the outer diameter of the outermost casing of the plurality of nested casings 12. In some embodiments, a long spacing may be greater than (and a short spacing may be less than or equal to) two, two and a half, three and a half, or four times the outer diameter of the outermost casing of the plurality of nested casings. For example, FIGS. 7 and 8 are diagrams of two sets of eccentered casings 170, 172. A three-dimensional model was used to generate the synthetic data for the two sets of eccentered 170, 172 and one set of centered casings. The diagrams illustrate the arrangement and provide the outer diameter (in inches), the thickness (in inches), and the eccentering (in inches) for each casing 174, 176, 178, 180 of the eccentrically-arranged synthetic casings 170, 172.

The inversion techniques above were used to process the synthetic data for a centered configuration of casings and the two eccentered configurations of casings 170 and 172, wherein the inversion model assumes that the casings for all configurations are centered.

FIGS. 9-12 are diagrams 190, 192, 194, 196 of the synthetic and inverted individual casing thickness data for each of the four casings 174, 176, 178, 180, in accordance with an embodiment of the present disclosure. The plots 190, 192, 194, 196 each include a horizontal axis 198 representing a set of synthetic data (by case number) and a vertical axis 200 representing the thickness of the particular casing 174, 176, 178, 180. In particular, the plots 190, 192, 194, 196 illustrate the inverted casing thickness data for the casings in the centered configuration and the two eccentered configurations, as well as that of the true casing thicknesses. As illustrated, the inverted data for the centered casings performs well, while the inverted data for the two sets of eccentered casings does not perform as well.

Figure 13:
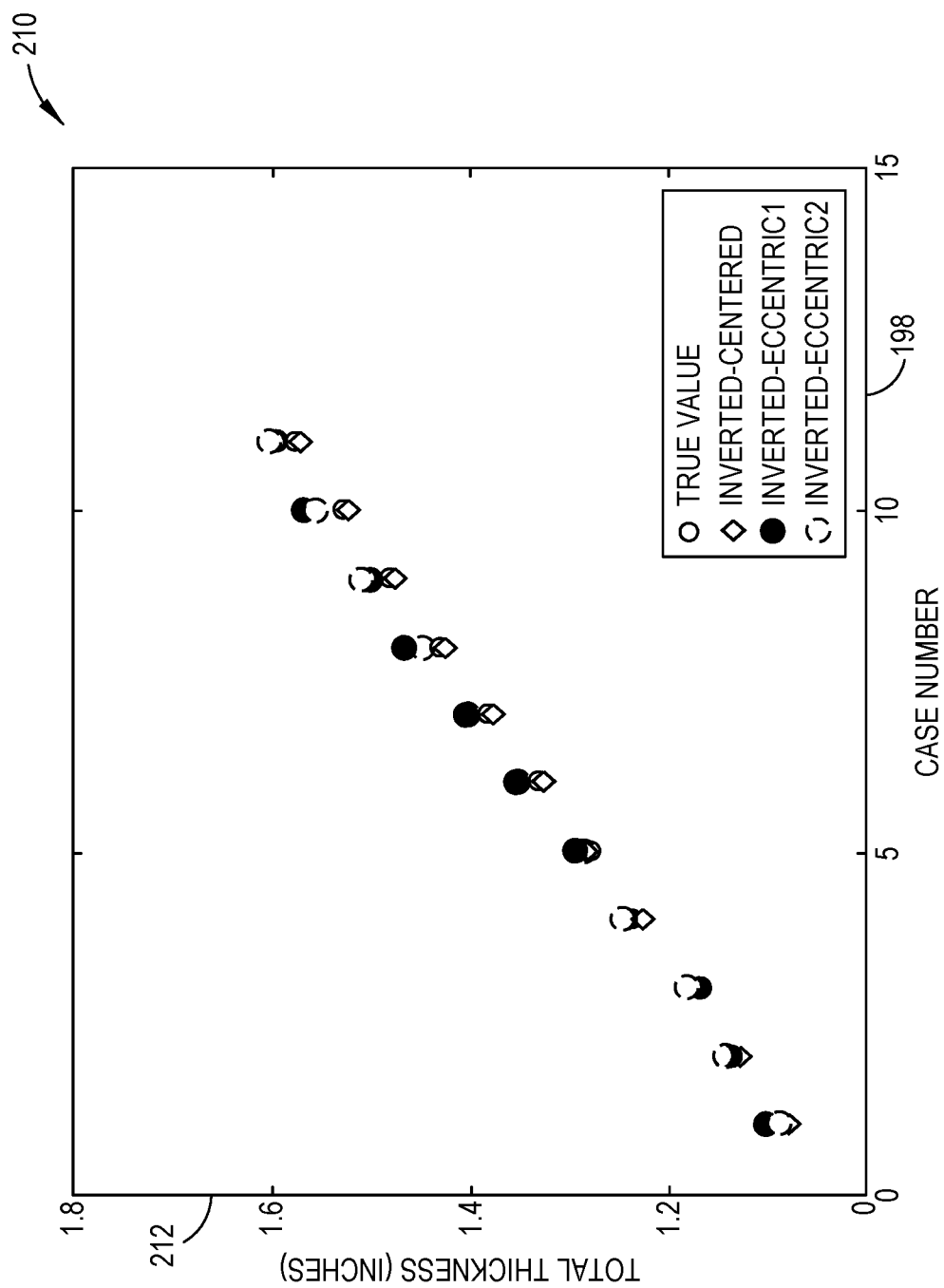
FIG. 13 is a plot of true and inverted total casing thickness for synthetic data, in accordance with an embodiment of the present disclosure.

FIG. 13 is a plot 210 of the synthetic and inverted total casing thickness data for all of the four casings 174, 176, 178, 180, in accordance with an embodiment of the present disclosure. The diagram 210 includes the horizontal axis 198 representing a set of synthetic data (by case number) and a vertical axis 212 representing the total casing thickness. In particular, the diagram 210 illustrates the inverted total casing thickness data as compared to the true value used to generate synthetic data. As illustrated, the inverted thicknesses for the both the centered and the eccentered configurations performs well.

Figure 14:
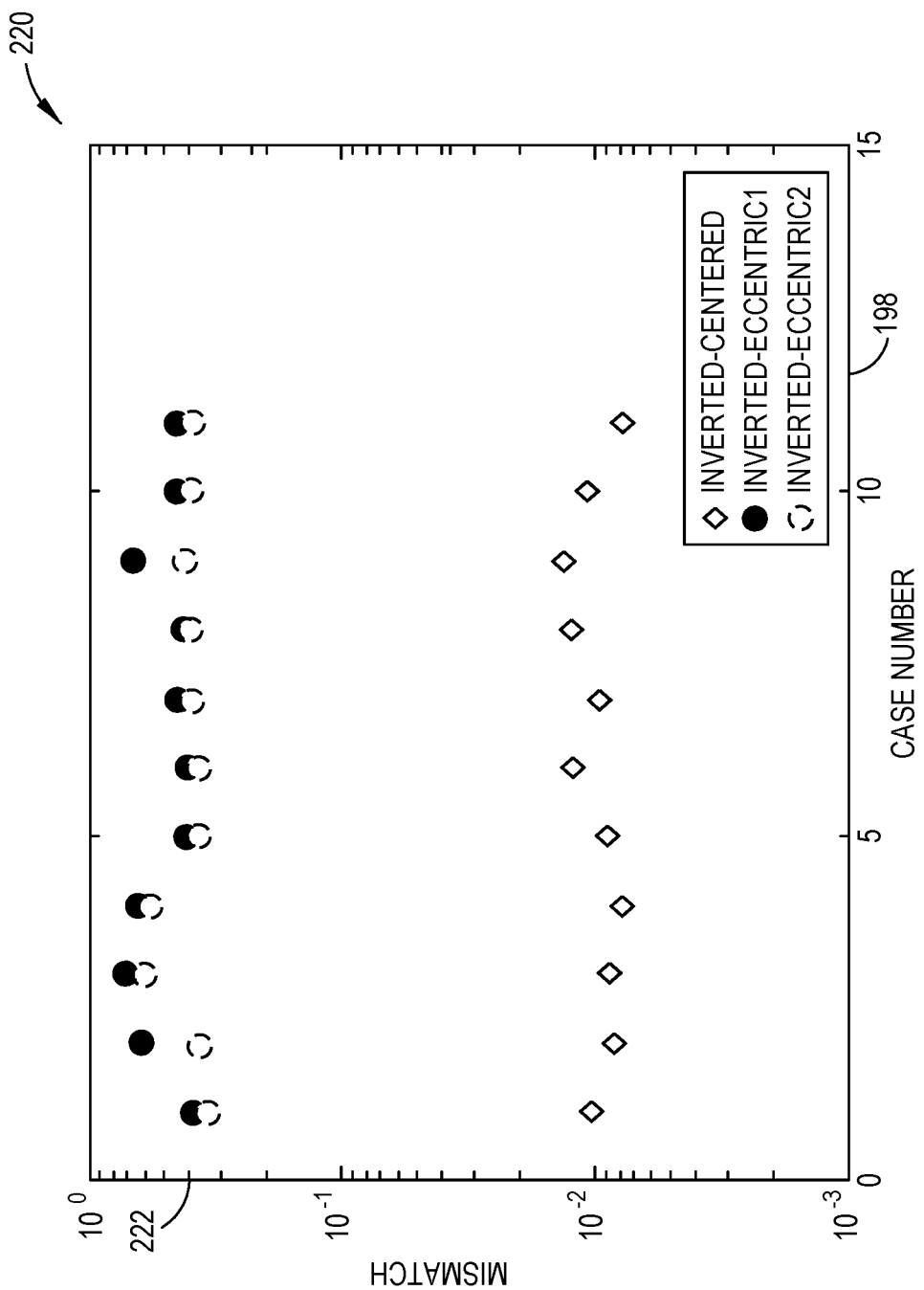
FIG. 14 is a plot of mismatches between synthetic and inversion reconstructed data, in accordance with an embodiment of the present disclosure.

FIG. 14 is a plot 220 of mismatches between the noisy synthetic data and simulated responses corresponding to the inversion-reconstructed thicknesses of casings in diagrams 190, 192, 194, 196, 210, in accordance with an embodiment of the present disclosure. The plot 220 includes the horizontal axis 198 representing a set of synthetic data (by case number) and a vertical axis 222 representing the mismatch as relative differences between the noisy synthetic data vs. the simulated responses corresponding to the inversion-reconstructed casings. In particular, the plot 220 illustrates the mismatch between the noisy synthetic data and the simulated responses corresponding to the inversion-reconstructed casings for the centered configuration, the noisy synthetic data and the simulated responses corresponding to the inversion-reconstructed casings for the first eccentered configuration 170, and the noisy synthetic data and the simulated responses corresponding to the inversion-reconstructed casings for the second eccentered configuration 172. As illustrated, there is a noticeable discrepancy between the mismatch of the inverted data for the centered casings and the mismatch of inverted data for the two sets of eccentered casings.

Figure 15:
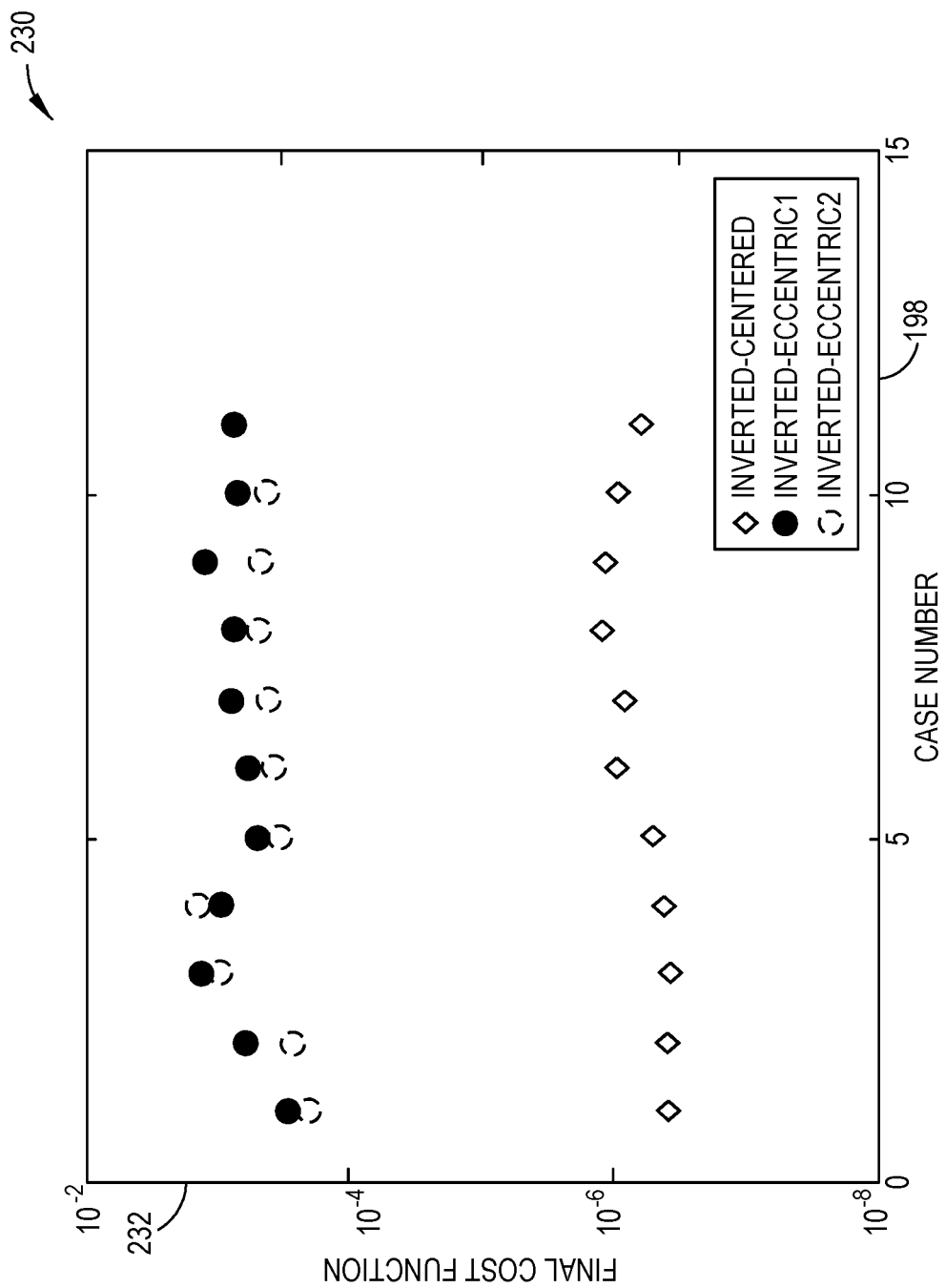
FIG. 15 is a plot of final cost functions for the different inversion cases, in accordance with an embodiment of the present disclosure.

FIG. 15 is a diagram 230 of final cost functions for the inverted data in plots 190, 192, 194, 196, 210, in accordance with an embodiment of the present disclosure. The plot 230 includes the horizontal axis 198 representing a set of synthetic data (by case number) and a vertical axis 232 representing the final cost function value. In particular, the diagram 230 illustrates the cost function of the inversions for the casings of the centered configuration and the casings of the two eccentered configurations 170, 172. As illustrated, there is a noticeable discrepancy between the final cost function of the inversion for the centered casings and the final cost function of the inversion for the two sets of eccentered casings.

Figure 16:
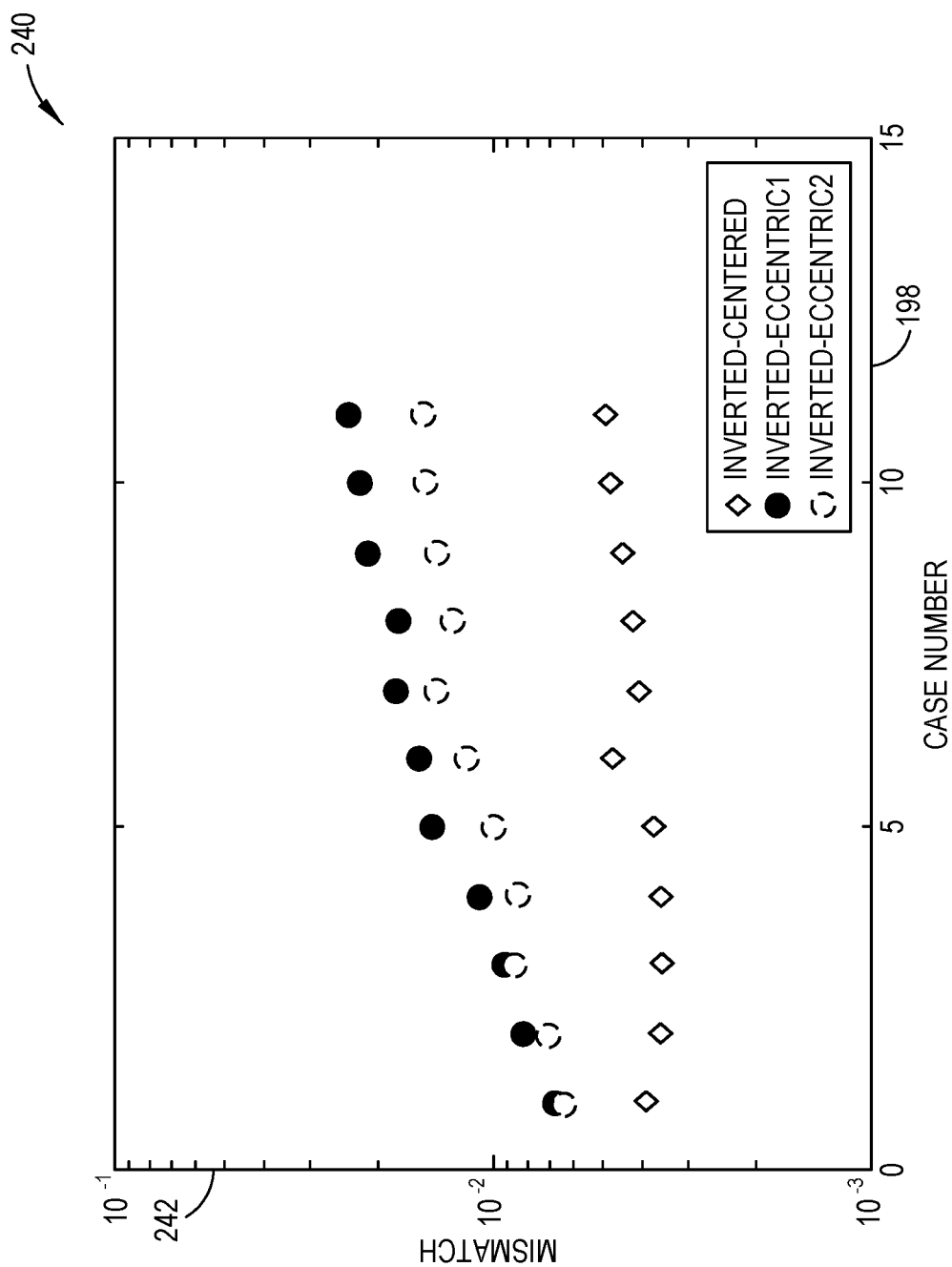
FIG. 16 is a plot of mismatches between synthetic and inversion reconstructed data corresponding to receivers with just long spacings, in accordance with an embodiment of the present disclosure.

FIG. 16 is a diagram 240 of mismatches between the noisy synthetic and simulated responses for the inversion reconstructed casings corresponding to receivers of the logging tool 16 with only long spacings from the transmitter 57 in plots 190, 192, 194, 196, 210, in accordance with an embodiment of the present disclosure. A long spacing may be a distance of a receiver from a center of a transmitter 57 that is greater than three times the outer diameter of the outermost casing of the plurality of nested casings 12. In a non-limiting example, the logging tool 16 that was modeled used five receivers.

The diagram 240 includes the horizontal axis 198 representing a set of synthetic data (by case number) and a vertical axis 242 representing the mismatch as relative differences between the noisy synthetic data vs. simulated responses corresponding to the inversion reconstructed casings data. In particular, the diagram 240 illustrates the mismatch between the synthetic data and the simulated responses corresponding to inversion reconstructed casings for the centered configuration, the synthetic data and the simulated responses corresponding to inversion reconstructed casings for the first eccentered configuration 170, and the synthetic data and the simulated responses corresponding to inversion reconstructed casings for the second eccentered configuration 172. As illustrated, there is a noticeable discrepancy between the mismatch of the inverted data for the centered casings and the mismatch of inverted data for the two sets of eccentered casings. However, the discrepancy is noticeably less than that of the data corresponding to receivers of the logging tool 16 that included those with short spacings, as seen in the diagram 220 of FIG. 14. As a result, the discrepancy between the inverted data corresponding to receivers that include receivers with short spacings compared to the inverted data corresponding to receivers with only long spacings may be used as an indicator of casings that are eccentrically arranged.

Figure 17:
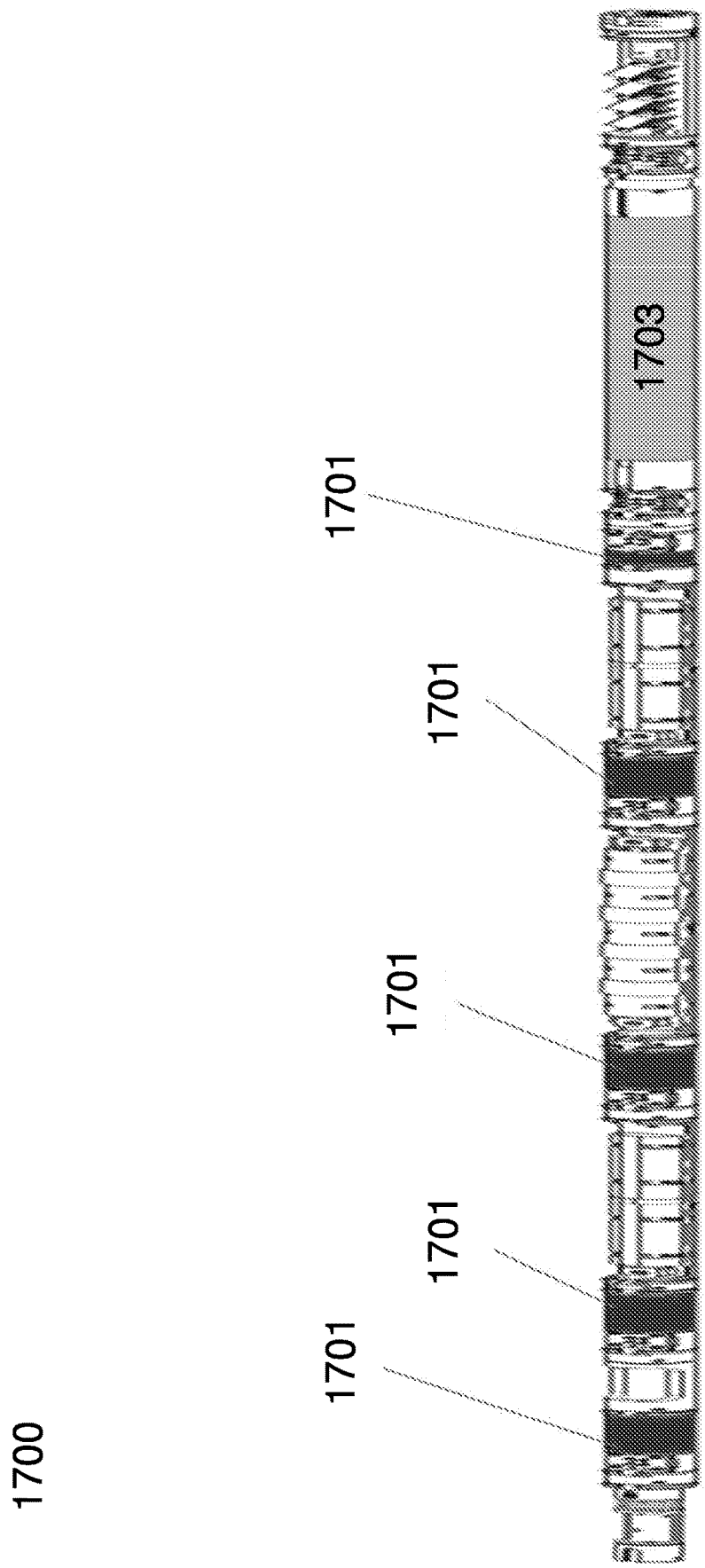
FIG. 17 shows an example tool layout in accordance with an embodiment of the present disclosure.

Referring now to FIGS. 17-26, embodiments of the present disclosure directed towards a system and method for analyzing an oilfield casing using an apparent thickness approach are provided. FIG. 17 shows an example tool 1700 showing receiver location 1701 with respect to the transmitter 1703. In this particular example, transmitter 1703 may include a Si-steel core, however, it should be noted that any suitable material may be used without departing from the scope of the present disclosure.

Figure 18:
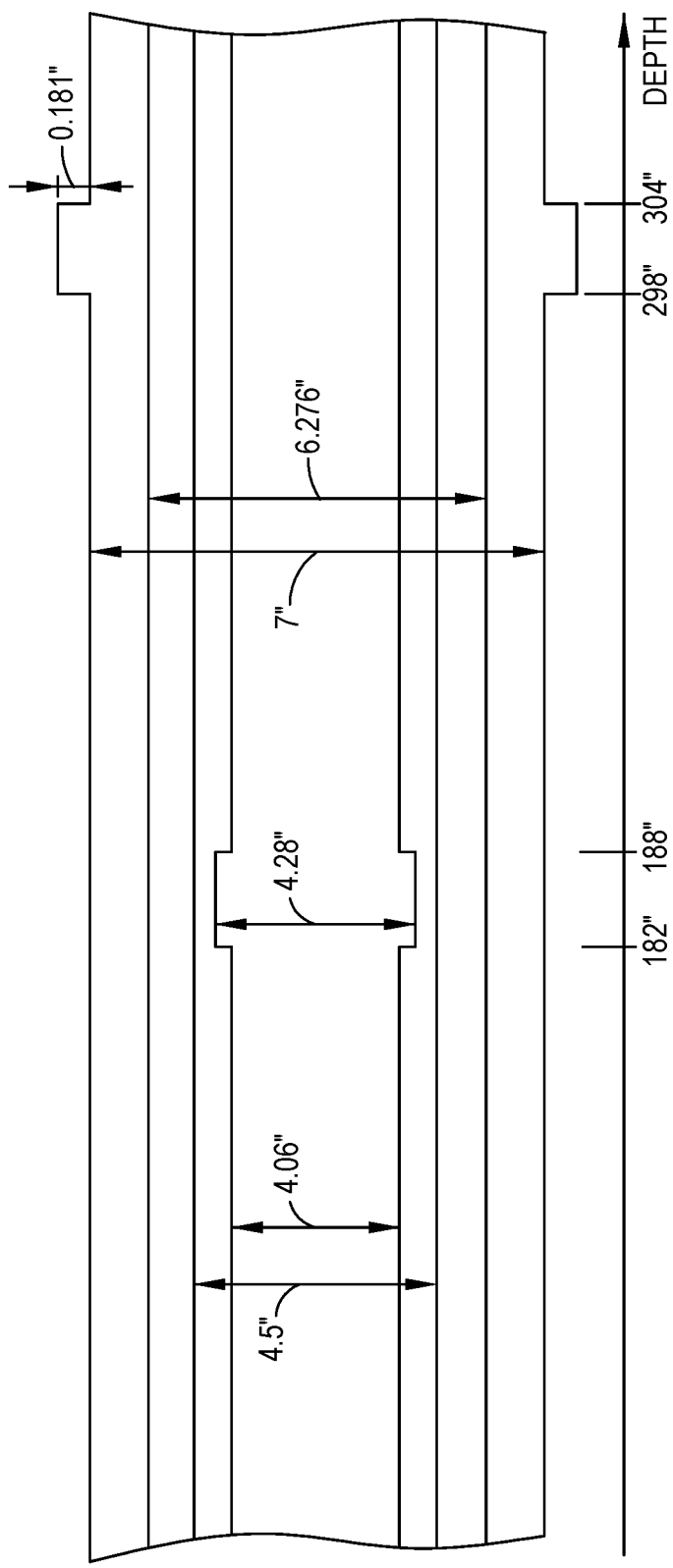
FIG. 18 shows two simulated casings in accordance with an embodiment of the present disclosure.

FIG. 18 shows a simulated example depicting two casings (e.g., having outer diameter ("OD"): 4.5", 7"; $th_{nom}$: 0.22", 0.362") in a synthetic example configuration.

Some particular tools may include a single $L_T$ long transmitter coil wound around a $L_{core}$ long magnetic (silicon steel) core. The five receivers may be placed at extremely short spacing channel ("XSSC"), short spacing channel ("SOSC"), long spacing channel ("LOSC"), long deghosting spacing channel ("LDSC") and very long spacing channel ("VLSC") from the center of the transmitter as shown in FIG. 17. The receivers have no core and are $L_R$ long, except for the extremely short spacing channel ("XSSC") receiver, which is $L_{sR}$ long.

Some tools may be capable of operating at various fundamental frequencies, including but not limited to, super low frequency ("SLF"), ultra-low frequency ("ULF"), very low frequency ("VLF"), low frequency ("LOF"), medium frequency ("MEF"), high frequency ("HIF") and very high frequency ("VHF"). These tools may be configured to acquire data from the odd harmonics, from a square wave-based transmitter source, etc. The individual casing thickness may be resolved in a multiple string configuration using a model-based nonlinear inversion. The presence of eccentered casing(s) may also be flagged based on the inversion misfit improvement from removing the shorter spacing measurements in inversion.

In some embodiments, a method for determining well integrity using estimated casing thicknesses in the cement integrity evaluation using acoustic measurements is disclosed. Embodiments of the present disclosure are also directed towards a de-ghosting method applied to a corrosion tool.

In some embodiments, a pre-processing method that may remove one or more double-indications of casing anomalies from asymmetric RFEC measurements (e.g., attenuation and phase) and may indicate the presence of eccentered casing(s) using shorter spacing measurements (e.g., attenuation and phase) is provided. Embodiments of the present disclosure work equally well for symmetrized measurements.

In some embodiments, the method may be used to remove double-indications of casing anomalies using remote field eddy-current (RFEC) two-coil measurements (e.g., attenuation and phase) and to indicate casing eccentering using two or more spacing measurements (e.g., attenuation and phase). The concept of "apparent thickness" may be used to assign each measurement a unique thickness value. For RFEC measurements, for example, the apparent thickness may indicate the total metal thickness for all casings, assuming that casing size changes proportionally, and/or based on some other user-defined rule.

In some embodiments, the method may assume that the measurements are calibrated with model responses for nominal casing sizes and pre-determined permeabilities and conductivities. An axi-symmetric model may be used to generate tool responses. This model may include tool details, including, but not limited to, magnetic core and a non-uniform mandrel profile. The methods may perform numerous operations simultaneously or separately.

Some operations consistent with the process included herein may include assigning one or more apparent thicknesses to any measurement. The apparent thicknesses for RFEC measurements may indicate the effective total metal thickness of all casings. The method may further include removing double-indications of casing collars from RFEC measurements. This may assume apparent thicknesses for at least two corresponding measurements are known. The method may also include removing casing collar artifacts (e.g., double indication and/or affected collar responses) from shorter spacing e.g., (non-RFEC) measurements and/or preserving sharp collar responses in shorter spacing (e.g., non-RFEC) measurements. The method may be configured to indicate zones where a casing or tool is eccentered using shorter spacing measurements. This may assume apparent thicknesses for these measurements are known.

In some embodiments, and as discussed above, each induction measurement from the casing inspection tool may be mapped to an apparent thickness, which may correspond to the effective amount of total metal seen by a specific transmitter-receiver coupling at a given frequency.

In some embodiments, the method may be configured to generate an apparent thickness lookup table by simulating axi-symmetric model tool responses for the proportionate change in each casing thicknesses, typically corresponding to 0.01 to 2.0 times the nominal thickness.

Figure 19:
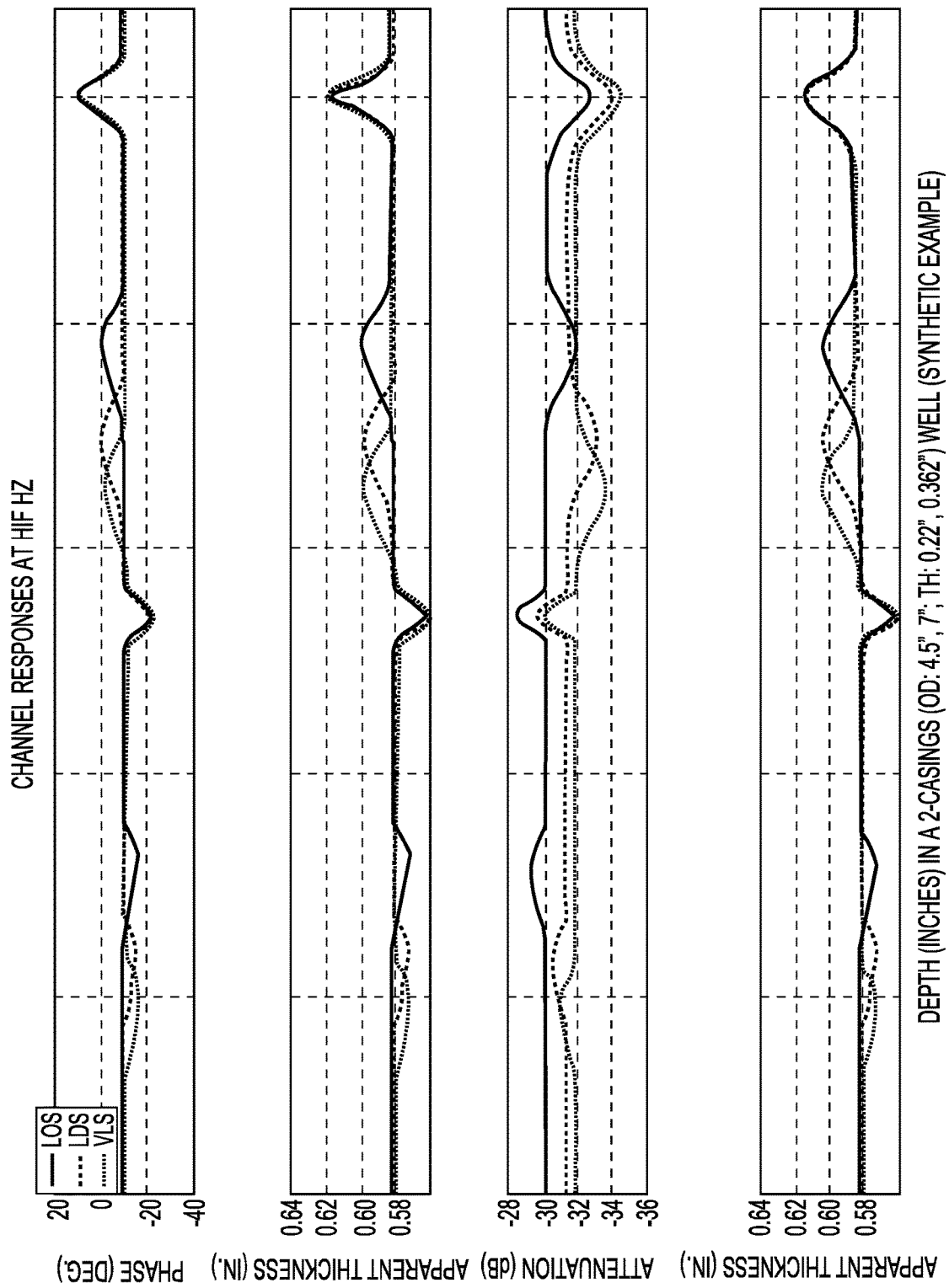
FIG. 19 shows a plot of synthetic data in accordance with an embodiment of the present disclosure.
Figure 21:
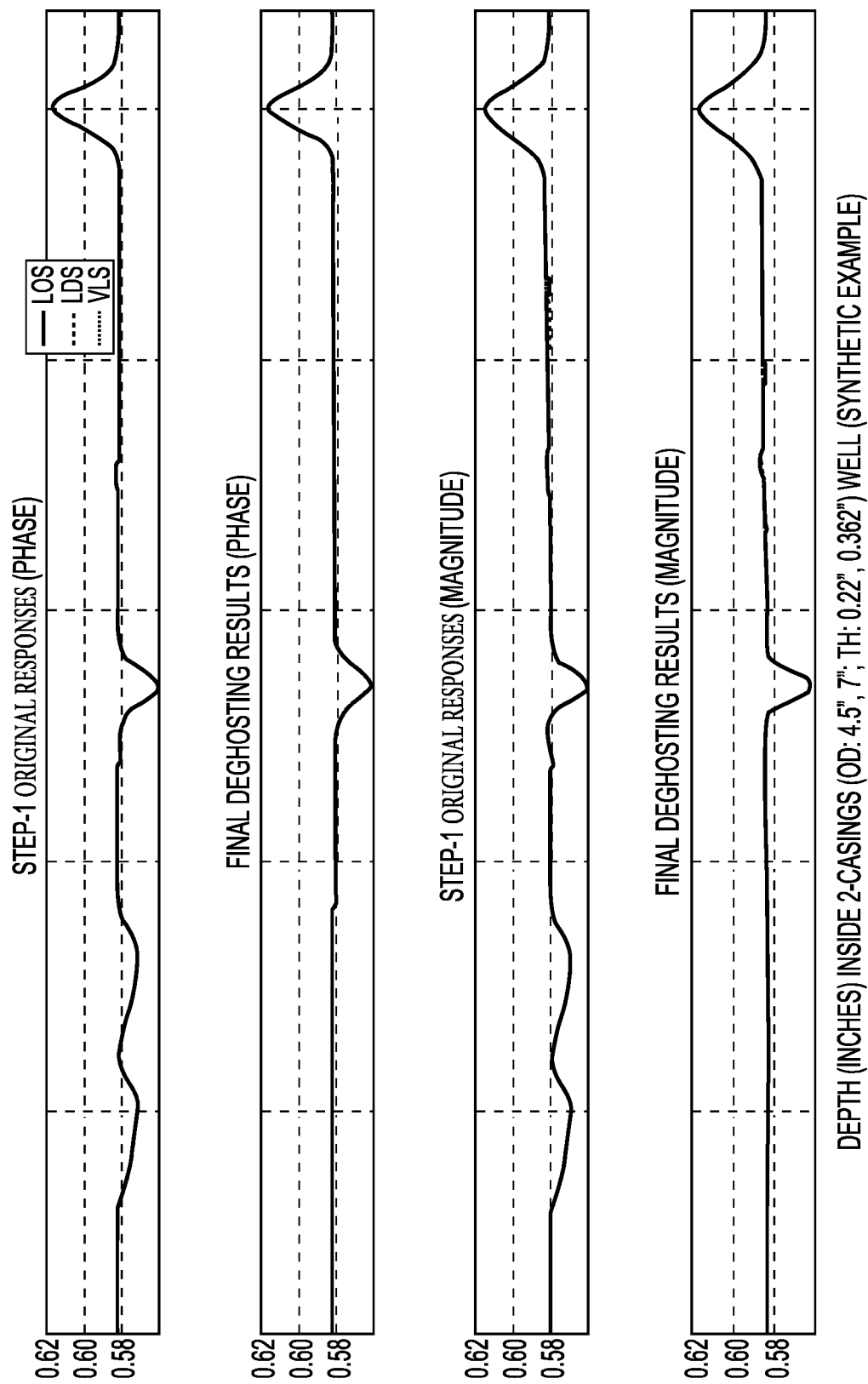
FIG. 21 shows deghosting results in accordance with an embodiment of the present disclosure.

For example, and as shown in FIG. 19, given two casings (having outer diameters: 4.5", 7"; thicknesses: 0.22", 0.362"; relative permeability, $\mu_r$=80 and conductivity, $\sigma$=5×10$^6$ S/m) the plot displays synthetic data from a tool at a HIF frequency. In this particular example, there is a corrosion defect, centered at depth 185", axial length 6" and radial extent 0.11", on the inner surface of the first casing. In addition, the process may be configured to mimic a thin collar on the outer surface of second casing by adding extra metal of axial length 6", radial extent 0.181" and centered at depth 301". Phase and attenuation responses for long spacings (long spacing channel ("LOSC"), long deghosting spacing channel ("LDSC") and very long spacing channel ("VLSC")) are shown in FIG. 19. It should be noted that the sharper responses may occur where the receiver crosses the anomaly and wider responses may occur when the transmitter crosses it. In this particular example, the responses are shown with reference to the receiver for each channel.

For this example, model responses at HIF Hz may be generated by assuming the thicknesses of both casings as [0.01 0.02 0.05 0.1 0.2, 0.4, 0.6, 0.8, 1.0, 1.2, 1.4, 1.6, 1.8, and 2] times their nominal thicknesses. These response tables may be used to determine the apparent thicknesses for each response, as shown in FIG. 19. It is apparent from FIG. 19 that the indication to casing anomalies may be repeated twice on each channel. In addition, it is also clear that the apparent thickness readings are the same for all responses when transmitter and receivers are crossing the defect, which may be used in the de-ghosting method discussed in further detail hereinbelow.

In some embodiments, the present disclosure may include a process configured to de-ghost RFEC measurements. For example, given a tool with a transmitter of length $L_T$ and two similar axial receivers of length $L_R$ located at $P_{R1}$ and $P_{R2}$ unit lengths from any fixed transmitter point (such that $2.5*OD_{max} < P_{R1} < P_{R2}$, where $OD_{max}$ is the outer diameter of the outermost casing), which is used to detect a defect of axial extent $L_D$.

In some embodiments, for a casing inspection induction tool, each receiver may include a double indication of the same defect or casing anomaly from an induction tool in depth. The first, for itself crossing the defect and the second (i.e, "ghost") for the transmitter crossing the defect. From the principles of linear convolution, the axial extent of the responses is $L_R+L_D$ and $L_T+L_D$, respectively. This behavior of responses is illustrated in FIG. 20. As in FIG. 19, the responses are shown with respect to the position of the receivers (resulting in R2–R1 shift in R1 response).

In some embodiments, the RFEC measured signal at both receivers are to the first order proportional to the total casing thickness (in skin-depths) and thus point to the same change in apparent thicknesses for the same defect. The method may use this redundancy to remove the ghosts coming from the transmitters as long as $L_D<|R2-R1|-L_T$, i.e., the length of defect may be less than the difference of the distance between receivers and transmitter. This may be achieved by replacing the apparent thicknesses from R1 ghosts by the apparent thicknesses from R2 and vice versa. These corrected apparent thicknesses may then be used to obtain the de-ghosted phase and attenuation responses from the already constructed apparent thicknesses response tables. From a given transmitter length, the expression $L_D<|R2-R1|-L_T$ may also provide the spacing between the receivers to achieve a required longitudinal defect resolution against the ghosting effect.

From an implementation perspective, a ghost from a corrosion defect (less metal than surrounding thicknesses) may be removed by taking the maximum of long spacing channel ("LOSC") and very long spacing channel ("VLSC") apparent thicknesses in the ghosted region whereas the collar (having more metal than surrounding thicknesses) ghost may be removed by taking the minimum of long spacing channel ("LOSC") and very long spacing channel ("VLSC") apparent thicknesses.

In operation, the process may include bringing the RFEC apparent thicknesses to the same level (referred to as rel_tha_LOSC and rel_tha_VLSC), identifying the corresponding zones as collars or defects, and correcting them accordingly, and then reinstating the differences and finally obtaining the de-ghosted responses.

Figure 23:
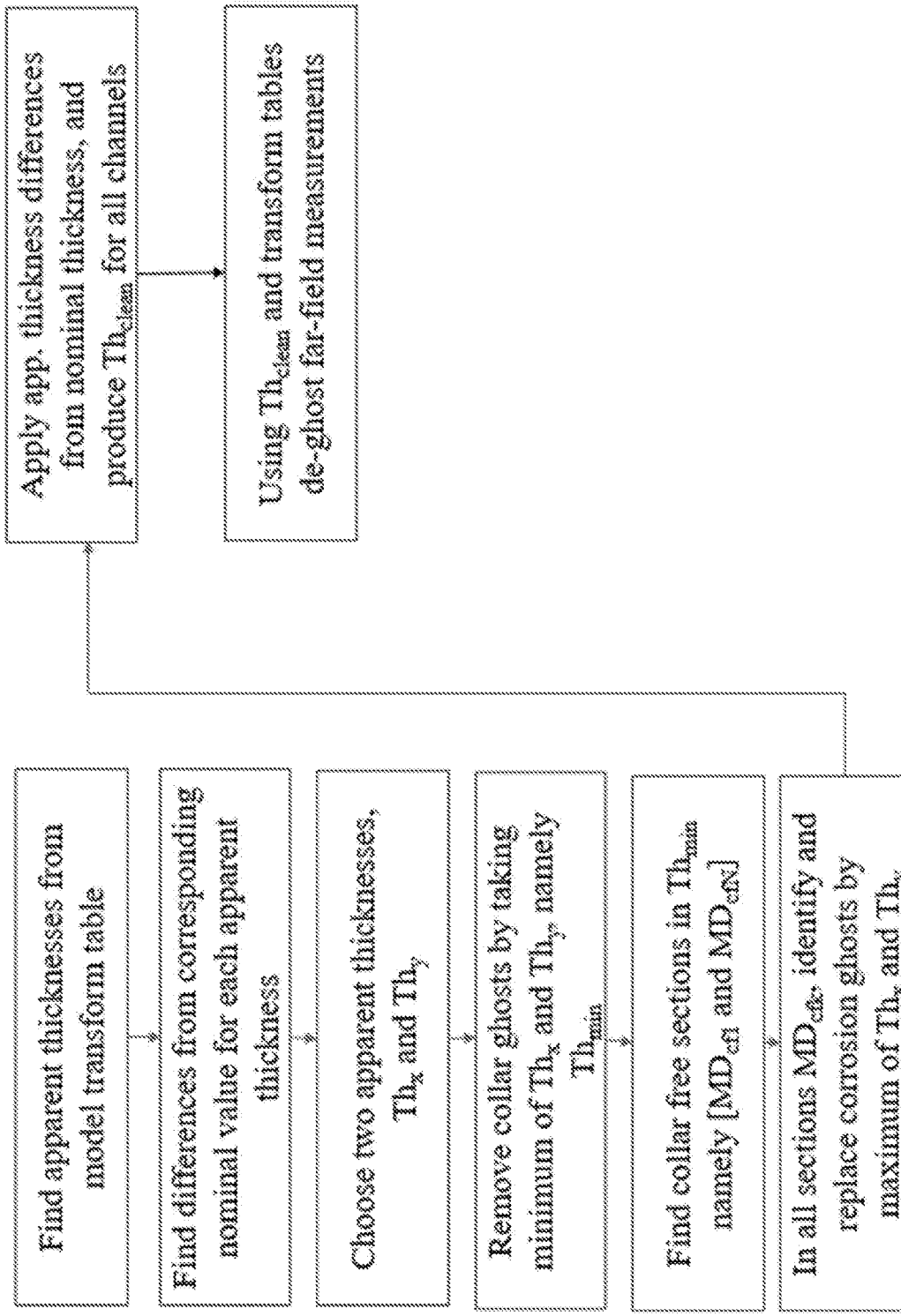
FIG. 23 shows a flow diagram in accordance with an embodiment of the present disclosure.

Referring now to FIG. 23, a de-ghosting flow diagram is provided where ThX and ThY are used respectively, for rel_tha_LOSC and rel_tha_VLSC. The core de-ghosting may be performed using one or more operations. First, the minimum of the rel_tha_LOSC and rel_tha_VLSC apparent thicknesses may be assigned to rel_tha_min array (one for phase and other for attenuation). This minimization operation may remove the collar ghosts but at the cost of added artifacts. Due to the decreasing effect of defects on apparent thicknesses, rel_tha_min will now have double the number of ghosts from corrosion defects; coming from long spacing channel ("LOSC") and very long spacing channel ("VLSC"). These doubled ghosts coming from the minimization step are shown in plots 1 and 3 of FIG. 21, which shows a deghosting algorithm corrected apparent thicknesses results for step 1 and step 2 (final step) for the two casings example. In this example, phase deghosting is displayed in the top two plots and attenuation deghosting is displayed in the bottom two plots. The method may then remove the doubled ghosts from rel_tha_min by replacing the ghosted apparent thicknesses with the maximum of rel_tha_LOSC and rel_tha_VLSC apparent thicknesses. To avoid reconstruction of collar ghosts, this operation may be applied on rel_tha_min log-sections without the casing collars. These collar-free sections may be found by localizing collars in rel_tha_min. Upon completion, one or more corrected apparent thicknesses for each RFEC measurement may be obtained by re-instating the corresponding differences of first step in rel_tha_min. Working with apparent thickness differences (from corresponding nominal values) rather than absolute values in addition to simplifying analysis also avoids losing, to the first order, any independency present in each of the RFEC channels.

Figure 22:
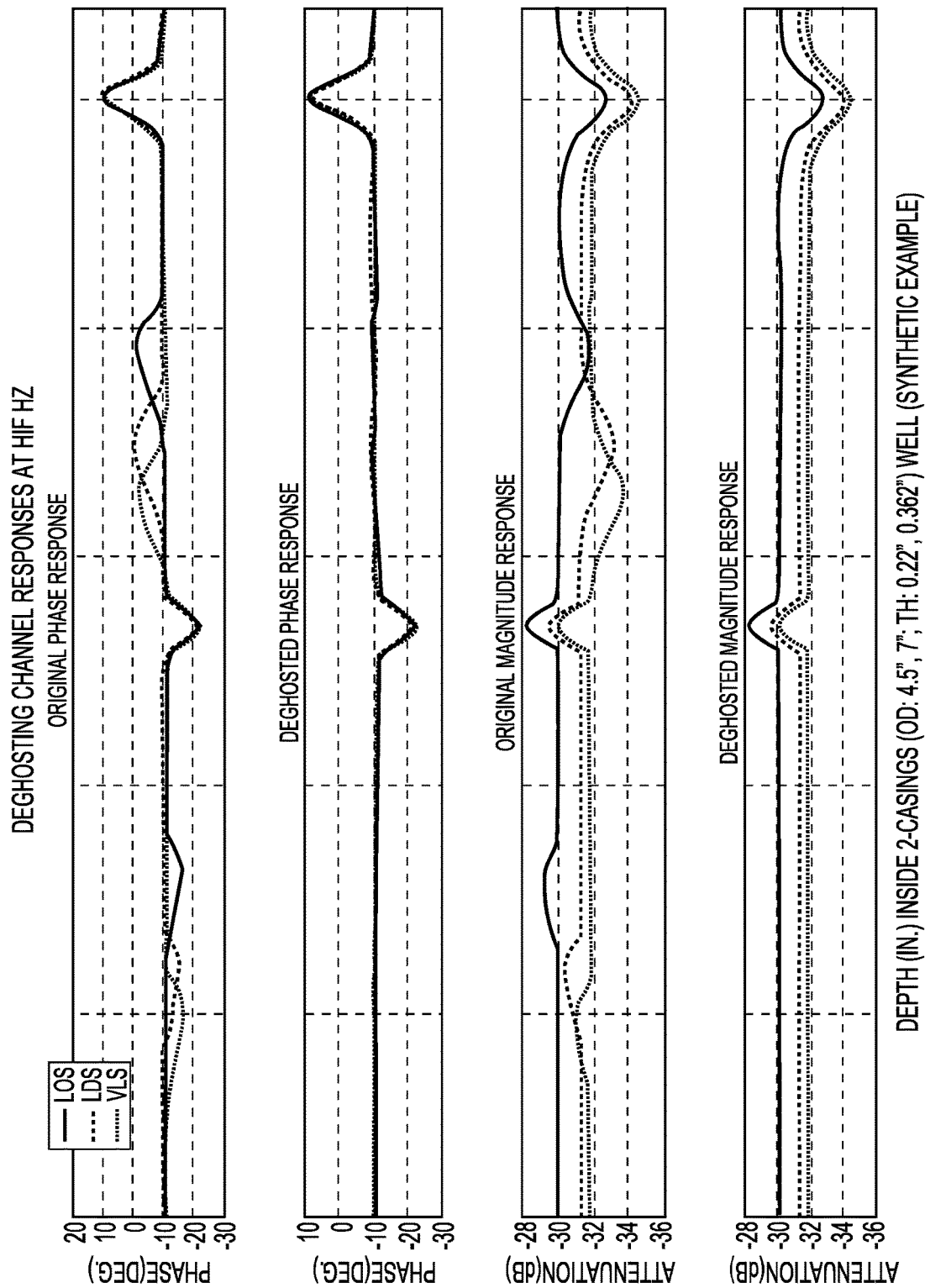
FIG. 22 depicts RFEC channels responses before and after applying embodiments of the present disclosure.

Referring again to FIG. 21, a plot showing the corresponding step by step apparent thicknesses resulting from the deghosting algorithm described above for the example from FIG. 18 is provided. Upon "correcting" the response apparent thicknesses, apparent thickness transform tables may be used to retrieve the corresponding corrected responses. FIG. 22 shows the final corrected responses (both before and after applying the deghosting algorithm described herein) obtained for the test example from the corrected apparent thicknesses. It should be noted that only the monotonic nature of RFEC regime responses enables this final conversion and also why the same cannot be applied to short spacing channel responses (RFEC assumption is not valid).

In some embodiments, the teachings of the present disclosure may be used to de-ghost one or more non-RFEC responses. For non-RFEC receivers, the same methodology may not be utilized since there is no redundancy and the apparent thickness to raw signal transform is non-unique. For these responses, collar de-ghosting may be performed on raw data utilizing collar location information from de-ghosted RFEC measurements such as very long spacing ("VLS"). For example, utilizing any spacing more than 2.5 times the maximum outside diameter of the phase apparent thickness of the pipes.

Figure 24:
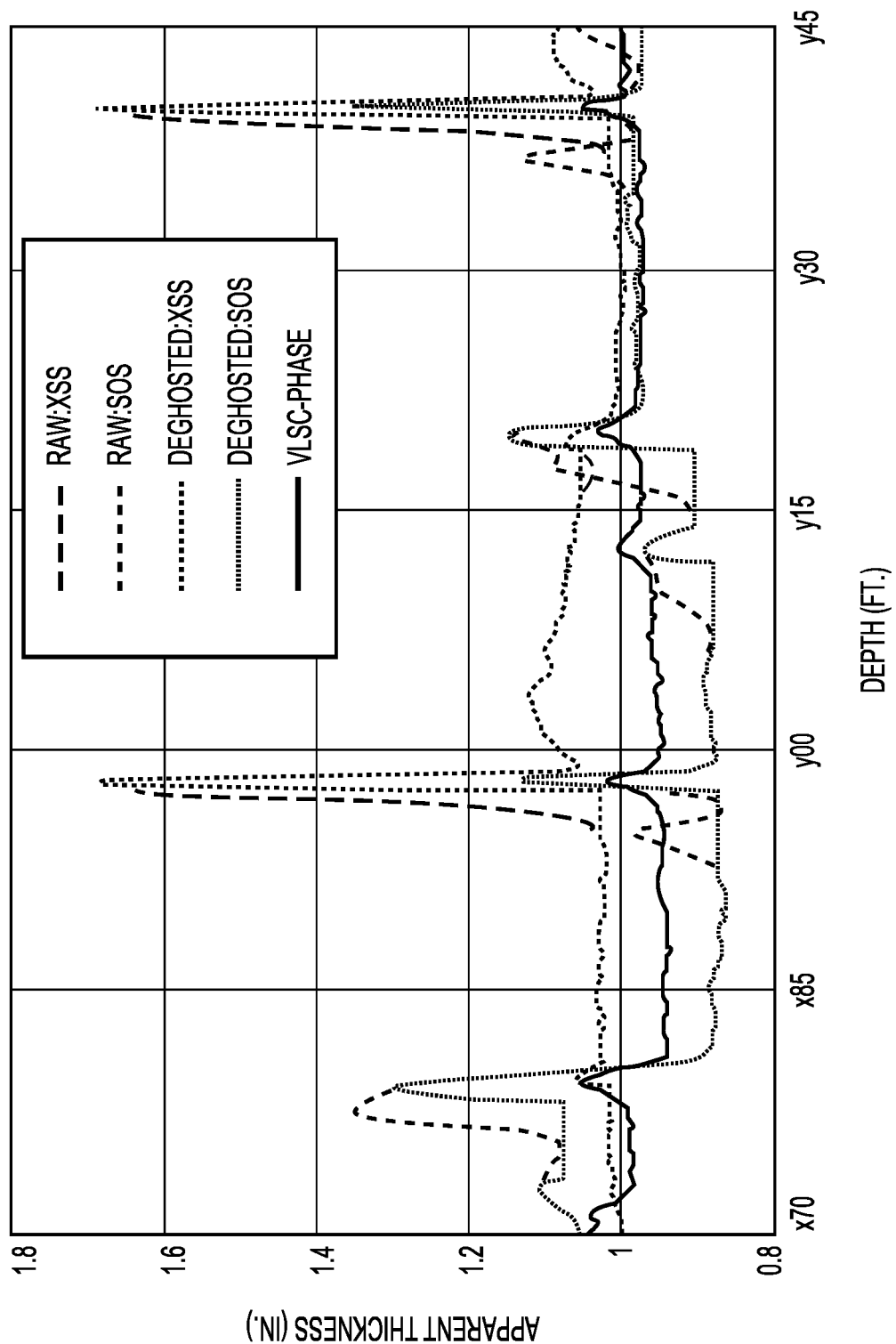
FIG. 24 shows examples of attenuation apparent thicknesses before and after applying an embodiment of the present disclosure.

As shown in FIG. 20, for a collar section longer than the spacing between the transmitter and receiver coil ends, the ghost may overlap with the typically sharp receiver response. For situations where the tool is moving upwards, and its transmitter is located at the bottom, the latter half of the collar response may be affected by the ghost, as shown in FIG. 24. Therefore, for short spacing situations, the de-ghosting may need to remove the ghost as well as preserve a sharp collar response.

In some embodiments, de-ghosting may be performed in several stages, and may be applied to phase and attenuation responses separately. Accordingly, the latter half of the collar response may be restored by taking values from symmetric (unaffected) first half of the lobe. Non-overlapping ghost segments may be flattened out. It may be necessary to replace the overlapping segment in extremely short spacing channel ("XSSC") receiver data by measurement value immediately outside the segment. The measurement value to flatten ghost segment of short spacing channel ("SOSC") receiver response may be taken from the point with minimum apparent thicknesses within $1.5\sigma$ (1.5 standard deviations) of the apparent thickness mean value in the ghost segment (e.g., we assume the ghost has a Gaussian shape). The choice of 'minimum apparent thickness' is an effort to capture any corrosion immediately after the collar whereas '$1.5\sigma$' criterion avoids outliers (coming from next collar and/or noise). The algorithm addresses sensitivities; for the $2^{nd}$ and $3^{rd}$ casing collars where the apparent thickness sometimes can be reduced, negative correction is applied, i.e. the measurement value to flatten ghost segment may be taken from the point with maximum of apparent thicknesses within $1.5\sigma$ of the mean value.

Accordingly, the apparent thicknesses may be used to identify the indices of measurements needed to restore the peak and to flatten the ghost. Collar peaks from the next collar and ghosts from previous collar may be avoided during ghost flattening and peak restoration steps, respectively. FIG. 24 shows a comparison of raw and collar de-ghosted extremely short spacing channel ("XSSC") and short spacing channel ("SOSC") attenuation apparent thicknesses together with de-ghosted very long spacing channel ("VLSC") phase apparent thickness used for localizing collars.

In some embodiments, the apparent thicknesses from short spacing receivers (i.e. $2.5*OD_{max}>P_R$) may be utilized as an indicator of eccentering. In an axi-symmetric casing setting, all apparent thicknesses from a receiver may reflect the same change in any axi-symmetric parameter (e.g., thickness, permeability, conductivity). Based on this principle, any separation of a shorter spacing receiver's apparent thicknesses may reflect eccentering. To make the separation more pronounced, the difference of apparent thicknesses from apparent nominal thickness may be used.

Figure 25:
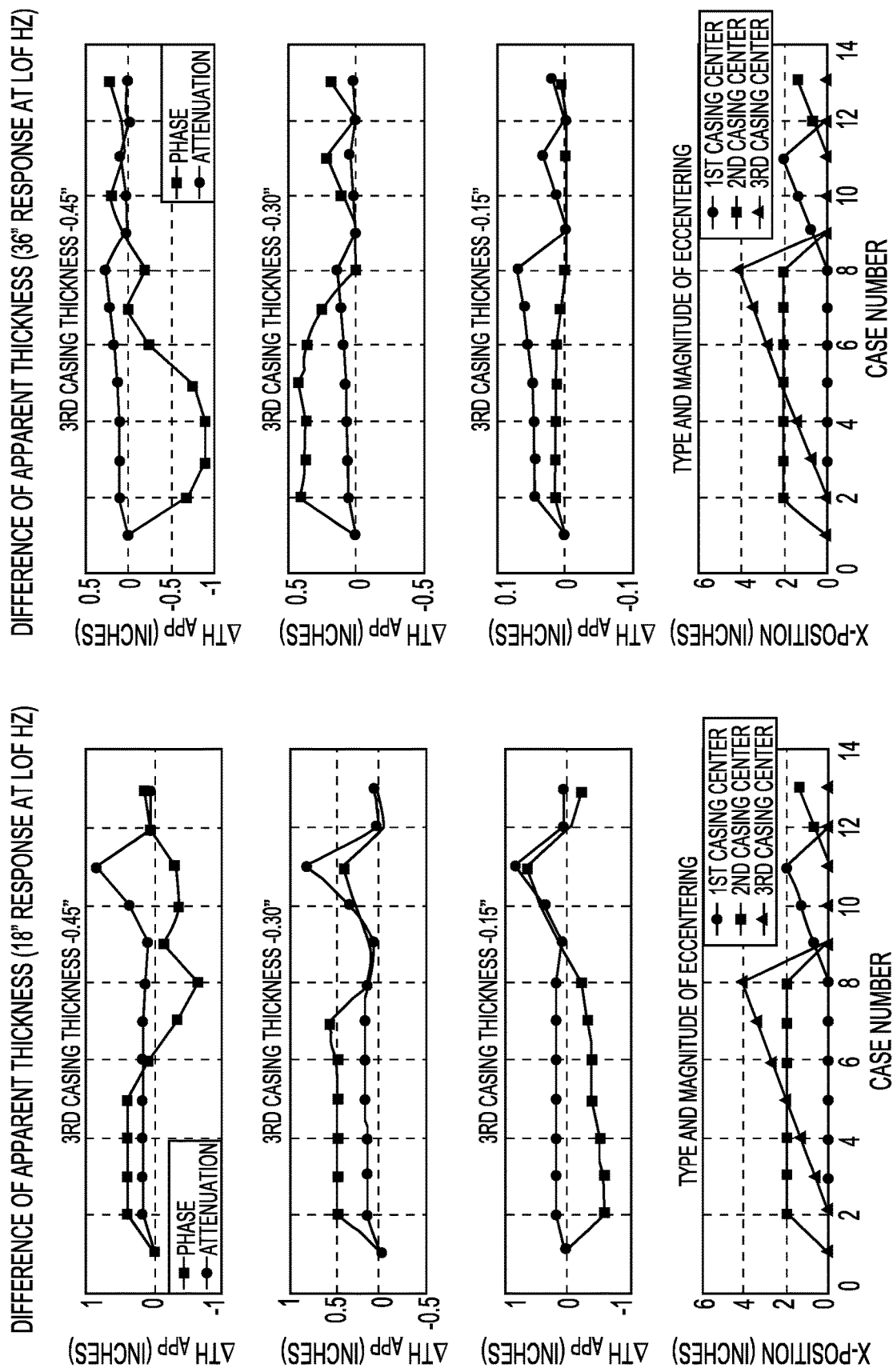
FIG. 25 shows results in accordance with an embodiment of the present disclosure.

FIG. 25 shows separation of apparent thicknesses difference (from case-1 value) as an indicator of casing eccentering with respect to tool axis, extremely short spacing channel ("XSSC") thickness separation (shown in the left plot) and short spacing channel ("SOSC") thickness separation for 0.45" 3rd casing (row 1), 0.3" 3rd casing (row 2) and 0.15" 3rd casing (row 3). The x-coordinates of the three casings are shown in row 4.

Specifically, in one example, 39 synthetic data sets corresponding to eccentering in 3-casings completion (outer diameters (in.): 8⅝, 13⅜, 18⅝; thicknesses (in.): 0.264, 0.33, 0.45; relative permeability, $\mu_r=80$ and conductivity, $\sigma=5\times10^6$ S/m) were obtained. In the simulations, the casings may be eccentered only along the x-axis. The tool axis may be assumed to be along the z-axis going through (0, 0); all the casing positions are with respect to tool axis. This example includes 13 eccentering positions. The first position corresponds to zero eccentering. For cases 2-8, the first casing may be centered whereas the second and third casings are eccentered. The second casing's center is fixed at x=2" and the third casing's center is moved from x=0" to x=4.2" in 7 equal steps. For cases 9-11, the second and third casings are centered whereas the first casing's center is moved to x=0.66", 1.33" and 2", respectively. For the last 2 cases, the first and third casings are centered whereas the second casing's center is moved to x=0.66" and 1.33". For each eccentering position, three values (0.15", 0.3" and 0.45") of the third casing thickness are taken. In FIG. 25, a plot of the difference of apparent thicknesses for all the 13 positions from the centered value for extremely short spacing channel ("XSSC") and short spacing channel ("SOSC") receivers at LOF Hz.

The separation of apparent thicknesses from phase and attenuation is not that pronounced for case 9 where the first casing axis is located at 0.66". For the rest, eccentering may be identified based on the separation of phase and attenuation apparent thicknesses (differences from centered value). It should be noted that any reference to specific casings and frequencies are provided merely by way of example and are not meant to limit the teachings of the present disclosure.

As discussed above, embodiments of the present disclosure may be configured to use an apparent thickness in interpreting multi-string data from multiple induction measurements channels. Methods for removing double-indications of casing anomalies from remote field eddy-current (RFEC) induction measurements (attenuation and phase), removing casing collar artifacts from shorter (non-RFEC) measurements and indicating casing eccentering using shorter spacing induction measurements (attenuation and phase) are provided.

Some operations may include generating apparent thickness transforms for measured attenuation and phase responses, by modeling a proportionate increase in all casing thicknesses. Operations may also include evaluating apparent thicknesses for each calibrated measurement using the corresponding transform. The apparent thicknesses for RFEC measurements may provide the effective total thickness. Operations may also include removing double-indications of casing collars from RFEC measurements; using apparent thicknesses for at least two spacings. Operations may further include removing casing collar artifacts (double indication and/or affected collar responses) from shorter spacing (non-RFEC) measurements and/or preserving sharp collar responses in shorter spacing (non-RFEC) measurements. Operations may also include indicating zones with casing or tool eccentering using shorter spacing measurements, by monitoring deviation of apparent thickness from nominal thickness. If deviation is both positive and negative, that is a likely signature of eccentering.

In some embodiments, the standard mode may assume that the casing permeabilities and conductivities are known. These may come from the manufacturer or from measurement calibration in a zone with minimal perturbation. The measurements have been calibrated with a model (used to generate the response tables) to give same tool response in the zone with minimal perturbation. The methodology has no assumption about the symmetrical location of the tool receivers. It works equally well for symmetrical or non-symmetric tools. The methodology also has no assumption about the tool model, it is not using dipole model or the far field approximation. It accurately approximates the tool details and sensor interactions with the casings.

FIG. 26 shows one example flowchart for analyzing an oilfield casing using an apparent thickness approach. Operations may include providing (2602) an induction instrument having at least one of a transmitter and a receiver configured to operate at one or more frequencies. The method may also include generating (2604), using data acquired by the induction instrument, one or more apparent thickness transforms for at least one of a measured attenuation and a phase response associated with an oilfield casing, wherein generating includes assuming a proportionate increase in all casing thicknesses. Numerous other operations are also within the scope of the present disclosure.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method for analyzing an oilfield casing using an apparent thickness approach comprising:
providing an induction instrument having at least one of a transmitter and a receiver configured to operate at one or more frequencies;
controlling the transmitter to emit a magnetic field signal that interacts with the oilfield casing to induce a corresponding secondary magnetic field signal;
controlling the receiver to detect the secondary magnetic field signal to obtain data relating to a thickness of the oilfield casing;
generating, using the data acquired by the induction instrument, one or more apparent thickness transforms for at least one of a measured attenuation and a phase response associated with the oilfield casing, wherein generating one or more apparent thickness transforms includes simulating a proportionate increase in all casing thicknesses; and indicating at least one zone with casing or tool eccentering using shorter spacing measurements, wherein the indicating includes monitoring a deviation of an apparent thickness from a nominal thickness.

2. The method of claim 1, further comprising:
removing one or more double-indications of casing anomalies from one or more remote field eddy-current (RFEC) induction measurements associated with the data.

3. The method of claim 1, further comprising:
removing casing collar artifacts from one or more shorter spacing (non-RFEC) induction measurements associated with the data.

4. The method of claim 1, further comprising:
indicating casing eccentering using one or more shorter spacing (non-RFEC) induction measurements.

5. The method of claim 1, wherein removing casing collar artifacts includes obtaining an unaffected first half of a lobe to restore a second half of a collar response and flattening a ghost segment from the one or more shorter spacing (non-RFEC) induction measurements.

6. The method of claim 1, wherein removing one or more double-indications of casing anomalies includes using apparent thicknesses for at least two spacings, wherein a difference in two spacings exceeds a length of a transmitter antenna.

7. The method of claim 1, wherein removing one or more double-indications of casing anomalies from one or more remote field eddy-current (RFEC) induction measurements includes using apparent thicknesses for at least two spacings, by assigning a higher apparent thickness.

8. The method of claim 1, further comprising:
obtaining the nominal thickness; and
applying an original deviation from the nominal thickness to generate one or more corrected apparent thicknesses.

9. The method of claim 6, further comprising:
using a transform table to generate a corrected measurement signal from the one or more corrected apparent thicknesses.

10. The method of claim 7, wherein the apparent thicknesses for RFEC measurements provide an effective total thickness.

11. A system for analyzing an oilfield casing using an apparent thickness approach comprising:
an induction instrument having at least one of a transmitter and a receiver configured to operate at one or more frequencies;
the transmitter is configured to emit a magnetic field signal that interacts with the oilfield casing, to induce a corresponding secondary magnetic field signal;
the receiver is configured to detect the secondary magnetic field signal to obtain data relating to a thickness of the oilfield casing; and
at least one computing device configured to generate, using the data acquired by the induction instrument, one or more apparent thickness transforms for at least one of a measured attenuation and a phase response associated with the oilfield casing, wherein the generating one or more apparent thickness transforms includes simulating a proportionate increase in all casing thicknesses; and indicate at least one zone with casing or tool eccentering using shorter spacing measurements, wherein indicating includes monitoring a deviation of an apparent thickness from a nominal thickness.

12. The system of claim 11, wherein the at least one computing device is further configured to:
remove one or more double-indications of casing anomalies from one or more remote field eddy-current (RFEC) induction measurements associated with the data.

13. The system of claim 11, wherein the at least one computing device is further configured to:
remove casing collar artifacts from one or more shorter spacing (non-RFEC) induction measurements associated with the data.

14. The system of claim 11, wherein the at least one computing device is further configured to:
indicate casing eccentering using the one or more shorter spacing (non-RFEC) induction measurements.

15. The system of claim 11, wherein removing casing collar artifacts includes obtaining an unaffected first half of a lobe to restore a second half of a collar response and flattening a ghost segment from the one or more shorter spacing (non-RFEC) induction measurements.

16. The system of claim 11, wherein removing one or more double-indications of casing anomalies includes using apparent thicknesses for at least two spacings, wherein a difference in two spacings exceeds a length of a transmitter antenna.

17. The system of claim 11, wherein removing one or more double-indications of casing anomalies from one or more remote field eddy-current (RFEC) induction measurements includes using apparent thicknesses for at least two spacings, by assigning a higher apparent thickness.

18. The system of claim 11, wherein the at least one computing device is further configured to:
   obtain the nominal thickness; and
   apply an original deviation from the nominal thickness to generate one or more corrected apparent thicknesses.

19. The system of claim 18, wherein the at least one computing device is further configured to:
   use a transform table to generate a corrected measurement signal from the one or more corrected apparent thicknesses.

20. The system of claim 17, wherein the apparent thicknesses for RFEC measurements provide an effective total thickness.

* * * * *